United States Patent [19]

Richardson et al.

[11] Patent Number: 5,083,039
[45] Date of Patent: Jan. 21, 1992

[54] VARIABLE SPEED WIND TURBINE

[75] Inventors: Robert D. Richardson, San Ramon; William L. Erdman, Livermore, both of Calif.

[73] Assignee: U.S. Windpower, Inc., Livermore, Calif.

[21] Appl. No.: 649,567

[22] Filed: Feb. 1, 1991

[51] Int. Cl.⁵ .......................... H02P 9/00; F03D 7/00
[52] U.S. Cl. ......................................... 290/44; 290/55
[58] Field of Search ...................................... 290/44, 55

[56] References Cited

U.S. PATENT DOCUMENTS

| | | | |
|---|---|---|---|
| 4,426,192 | 1/1984 | Chertok et al. | 416/1 |
| 4,490,093 | 12/1984 | Chertok et al. | 416/26 |
| 4,525,633 | 6/1985 | Wertheim et al. | 290/44 |
| 4,695,736 | 9/1987 | Doman et al. | 290/44 |
| 4,700,081 | 10/1987 | Kos et al. | 290/44 |
| 4,703,189 | 10/1987 | DiValentin et al. | 290/44 |
| 4,816,696 | 3/1989 | Sakayori et al. | 290/52 |
| 4,891,744 | 1/1990 | Yamamoto et al. | 363/89 |
| 4,994,684 | 2/1991 | Lauw et al. | 290/44 |

Primary Examiner—A. D. Pellinen
Assistant Examiner—Robert L. Hoover
Attorney, Agent, or Firm—Blakely, Sokoloff, Taylor & Zafman

[57] ABSTRACT

A variable speed wind turbine is disclosed comprising a turbine rotor that drives an AC induction generator, a power converter that converts the generator output to fixed-frequency AC power, a generator controller, and an inverter controller. The generator controller uses field orientation to regulate either stator currents or voltages to control the torque reacted by the generator. The inverter controller regulates the output currents to supply multi-phase AC power having leading or lagging currents at an angle specified by a power factor control signal.

138 Claims, 15 Drawing Sheets

FIELD ORIENTATION
CONVERTER 94

DELTA MODULATOR CURRENT CONTROLLER

CURRENT CONTROLLER LINE SIDE

VARIABLE SPEED WIND TURBINE

REFERENCE TO MICROFICHE APPENDIX

Reference is hereby made to a microfiche appendix submitted herewith, consisting of two microfiche of 119 frames.

BACKGROUND OF THE INVENTION

1. Field of the Invention

This invention relates generally to wind turbines that operate at variable speed under varying wind conditions, and relates more particularly to a power converter for converting wind energy into AC electrical power at a controlled power factor and for controlling the torque generated by the wind turbine.

2. Description of the Relevant Art

Wind turbines provide a primary source of energy that can be converted into electricity and supplied to utility power grids. Conversion of wind energy to electrical energy is accomplished in a wind turbine by driving an electrical generator, commonly an AC induction generator. If the electrical power generated by a wind turbine is to be supplied to a utility power grid, then it is required to have a constant frequency, e.g., 60 Hertz, that is synchronized to the utility line frequency. This can be accomplished by driving the generator at a constant rotational speed, which, unless a variable speed transmission is used, requires that the wind turbine rotate at a constant speed. Unfortunately, constant speed operation of a wind turbine limits its energy conversion efficiency due to variable wind conditions. Turbine rotor speed needs to be proportional to wind speed for optimal energy recovery.

Variable speed wind turbines have been proposed as a way of increasing the energy conversion efficiencies of constant speed wind turbines. By varying the rotor speed in varying wind conditions, improved energy recovery can be achieved over a range of wind speed. Also importantly, the peak mechanical stresses caused by wind gusts can be reduced by limiting the torque reacted on the wind turbine by the generator and allowing the wind turbine to speed up in response to wind gusts. The increased kinetic energy of the rotor caused by wind gusts serves as a short term energy storage medium to further improve energy conversion. Such operation, however, requires a responsive torque control system.

Although variable speed wind turbines are advantageous from the perspective of increased energy conversion and reduced stresses, the electrical generation system is more complicated than that of a constant speed wind turbine. Since a generator is usually coupled to a variable speed rotor through a fixed-ratio gear transmission, the electrical power produced by the generator will have a variable frequency. This requires a conversion from the variable frequency AC output by the generator to a constant frequency AC for supplying the utility power grid. The conversion can be accomplished either directly by a frequency converter or through an intermediate conversion to DC by a rectifier and reconversion to fixed-frequency AC by an inverter.

SUMMARY OF THE INVENTION

In accordance with one illustrated embodiment, the present invention includes a variable speed wind turbine comprising a turbine rotor that drives a multiphase generator, a power converter with active switches that control stator electrical quantities in each phase of the generator, a torque command device associated with turbine parameter sensors that generates a torque reference signal indicative of a desired torque, and a generator controller operating under field orientation control and responsive to the torque reference signal for defining a desired quadrature axis current and for controlling the active switches to produce stator electrical quantities that correspond to the desired quadrature axis current.

The present invention includes a method for controlling torque reacted by a multiphase generator of a wind turbine, where a power converter with active switches controls electrical quantities in the stator of the generator to establish a rotating flux field in the rotor of the generator. The method includes the steps of defining a torque reference signal indicative of a desired generator torque, converting the torque reference signal into a desired quadrature axis current representing torque in rotating field coordinates normal to the rotor flux field, and controlling the active switches of the power converter to produce stator electrical quantities that correspond to the desired quadrature axis current.

The field oriented control defines the desired generator operation in terms of a rotating frame of reference to decouple flux-producing currents from torque-producing currents. The desired generator operation is defined by a desired direct axis (flux-producing) current in rotating field coordinates aligned with the direction of the rotor flux field and a desired quadrature axis (torque-producing) current in field coordinates oriented normal to the rotor flux field. Generator torque is controlled by controlling the quadrature axis current. The angle of the field coordinate system with respect to a stationary frame of reference defines a desired rotor flux angle, which is periodically determined and used to convert the desired direct and quadrature axis currents from field coordinates into stator coordinates. A pulse width modulation circuit controls the active switches to produce stator electrical quantities that correspond to the desired stator electrical quantities. The power converter is preferably a rectifier/inverter with a DC voltage link. The rectifier has active switches in a bridge configuration that control the currents and voltages at the generator side of the power converter, while the inverter has active switches in a bridge configuration that control the currents at the line side of the power converter.

The stator electrical quantities that are regulated are either currents or voltages. When regulating currents, desired currents defined by the field oriented control are converted to desired stator currents, and the active switches of the power converter are controlled to produce corresponding stator currents. When regulating voltages, the desired field oriented currents are converted into desired field oriented voltages by compensating for cross-coupling between the direct and quadrature axes, the desired field oriented voltages are converted into desired stator voltages, and the active switches are controlled to produce corresponding stator voltages.

In one embodiment, the generator controller regulates the generator torque by controlling the stator currents at a low speed of rotation of the generator and by controlling the stator voltages at a higher speed of rotation of the generator. During low speed operation of the generator, the orientation of the rotor flux field with respect to the rotor is controlled by switching the active rectifier to regulate currents in the stator, while during the higher speed operation of the generator, the orientation of the rotor flux field is controlled by switching the active rectifier to regulate voltages in the stator. Switching between current control and voltage control is preferably controlled by a rotor speed signal that indicates rotor speed.

One embodiment of the current controller, is particularly useful for controlling currents flowing into the power converter from the generator side and flowing out of the power converter at the line side. This current controller periodically determines a distortion index indicative of errors between desired and actual currents, and controls the active switches of the power converter to produce currents that minimize the distortion index.

The present invention further includes an apparatus and method for controlling the active switches at the line side inverter to supply output electricity at a desired angle between voltage and current. This aspect of the invention includes an inverter controller that forms a reference waveform, rotates the reference waveform by a selected power factor angle to yield a template waveform, uses the template waveform to define desired output currents, and controls the active switches to produce output currents corresponding to the desired output currents.

One key feature of the present invention is the use of field orientation control of the rectifier to control generator torque. Field orientation decouples the torque-producing currents or voltages of the generator stator from the flux-producing currents or voltages and thus permits responsive control of generator torque.

Another feature is a hybrid control strategy for the rectifier in controlling either the stator currents or stator voltages. Current control is used where the stator currents can be assumed to be supplied by current sources, which is a valid assumption at low rotor speeds due to a large margin between the DC bus voltage of the rectifier and the counter emf of the generator. Voltage control is used at higher rotor speeds where current control would otherwise require increasing the DC bus voltage proportional to speed to maintain responsive control and constant volts/hertz operation. Voltage control has an increased power capability over current control at higher speeds while maintaining constant volts/hertz operation and moderate DC bus voltages, thus allowing the use of lower voltage switching devices than would be required for current control. Voltage control is also more efficient than current control at high speeds due to reduced switching losses in the rectifier due to lower DC bus voltages for the same power level. Under voltage control, the stator voltages in field coordinates are compensated by decoupling factors, so that two control voltages are developed, one for controlling torque and the other for controlling rotor flux.

Still another feature of the invention is a particular current control algorithm, which determines optimum PWM commutation signals for the rectifier and inverter by periodically minimizing a distortion index indicative of current errors. This algorithm reduces total harmonic distortion over competing algorithms operating at comparable sampling frequencies, while reducing switching losses by reducing the number of switching events.

At the line side of the power converter, the inverter controller of the present invention offers some of the same advantages as the generator controller in terms of efficient and low-distortion power conversion through the use of the current control algorithm that minimizes a distortion index. In addition, the inverter controller provides power factor control by adjusting the output current anywhere between fully leading and fully lagging the output voltage, thereby supplying or absorbing selectable amounts of reactive power. This feature of the invention solves reactive power problems normally associated with induction generators, and also replaces power factor correction capacitors that would otherwise be needed on the utility line. Power factor correction can also take place when the wind turbine is not in use.

The features and advantages described in the specification are not all inclusive, and particularly, many additional features and advantages will be apparent to one of ordinary skill in the art in view of the drawings, specification and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

DETAILED DESCRIPTION OF THE PREFERRED EMBODIMENT

FIGS. 1 through 15 of the drawings disclose various embodiments of the present invention for purposes of illustration only. One skilled in the art will readily recognize from the following discussion that alternative embodiments of the structures and methods illustrated herein may be employed without departing from the principles of the invention.

Figure 1:
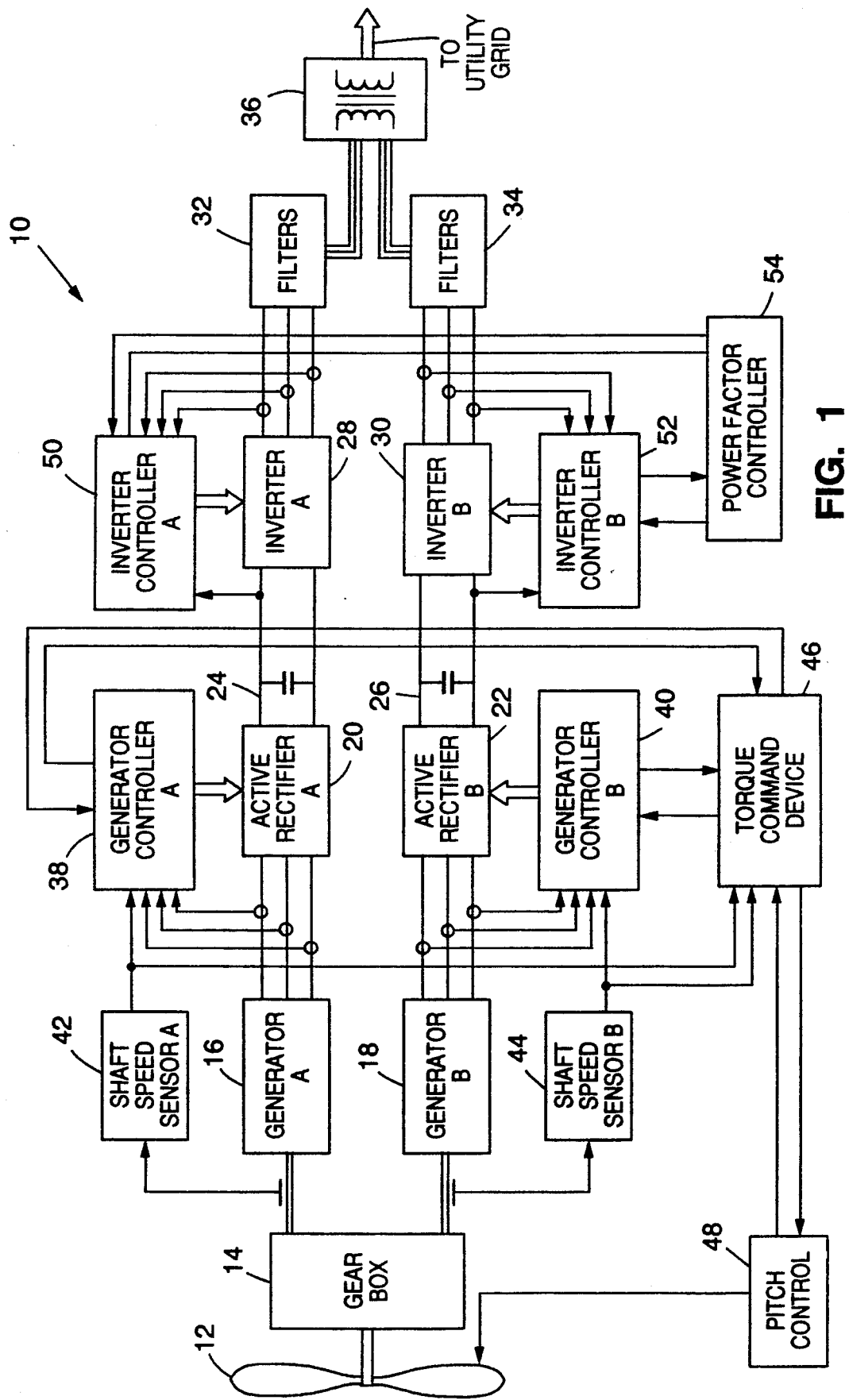
FIG. 1 is a block diagram of a wind turbine in accordance with the present invention.

The preferred embodiment of the present invention is a variable speed wind turbine with a power converter that supplies constant frequency, high quality power at an adjustable power factor to a utility grid. As shown in FIG. 1, the wind turbine 10 includes a variable pitch turbine rotor 12 that is mechanically coupled through a gear box 14 to two 3-phase AC induction generators 16 and 18. The gear box 14 includes a fixed-ratio, step-up transmission, so that the generator rotors rotate at a fixed multiple of the speed of the turbine rotor. The generators 16 and 18 produce 3-phase AC electricity at a variable frequency that is proportional to the speed of the turbine rotor. The electricity generated by each generator 16 and 18 is converted from variable frequency AC to fixed frequency AC by power converters that comprise active rectifiers 20 and 22, DC voltage links 24 and 26, inverters 28 and 30, and filters 32 and 34. The outputs of the filters 32 and 34 are combined at a transformer 36, the output of which is supplied to the utility grid.

The two generators, both of which rotate at all times whenever the turbine rotor rotates, are preferred over one generator in this embodiment in order to build a high capacity wind turbine while using readily available generators. The invention can, of course, be implemented in a wind turbine with only one generator or more than two generators.

Each of the generators 16 and 18 is controlled separately by generator controllers 38 and 40, which, as explained below, control the torque reacted by the generators by controlling the stator currents or voltages. Shaft speed sensors 42 and 44 monitor the rotor speed of the two generators, respectively, and supply rotor speed information to the generator controllers 38 and 40 and to a torque command device 46. The inverters 28 and 30 are controlled separately by inverter controllers 50 and 52. A power factor controller 54 directs the inverter controllers 50 and 52 to provide power factor correction by shifting the output current with respect to the output voltage.

The torque command device 46 monitors wind turbine performance parameters and generates torque control signals to the generator controllers 38 and 40 and pitch angle control signals to a pitch control unit 48. Stored within the torque command device 46 is a table of optimal values of torque, pitch angle, and rotor speed for various operating conditions. These values are given as a function of an estimated wind speed, which is determined by an aerodynamic model of the wind turbine having inputs of rotor speed from the speed sensors 42 and 44, measured pitch angle from the pitch control unit 48, and measured torque from the generator controllers 38 and 40. In order to improve the dynamic stability of the overall control system, a speed control signal is used to adjust the optimal values of pitch angle and torque found from the table. The speed control signal is proportional to the difference between the optimal desired speed from the table and the measured speed from the speed sensors 42 and 44. The torque command device 46 thus determines desired values of torque and pitch angle based on the sensed operating conditions and supplies torque and pitch angle control signals to the generator controllers 38, 40 and pitch control unit 48, respectively.

Figure 2:
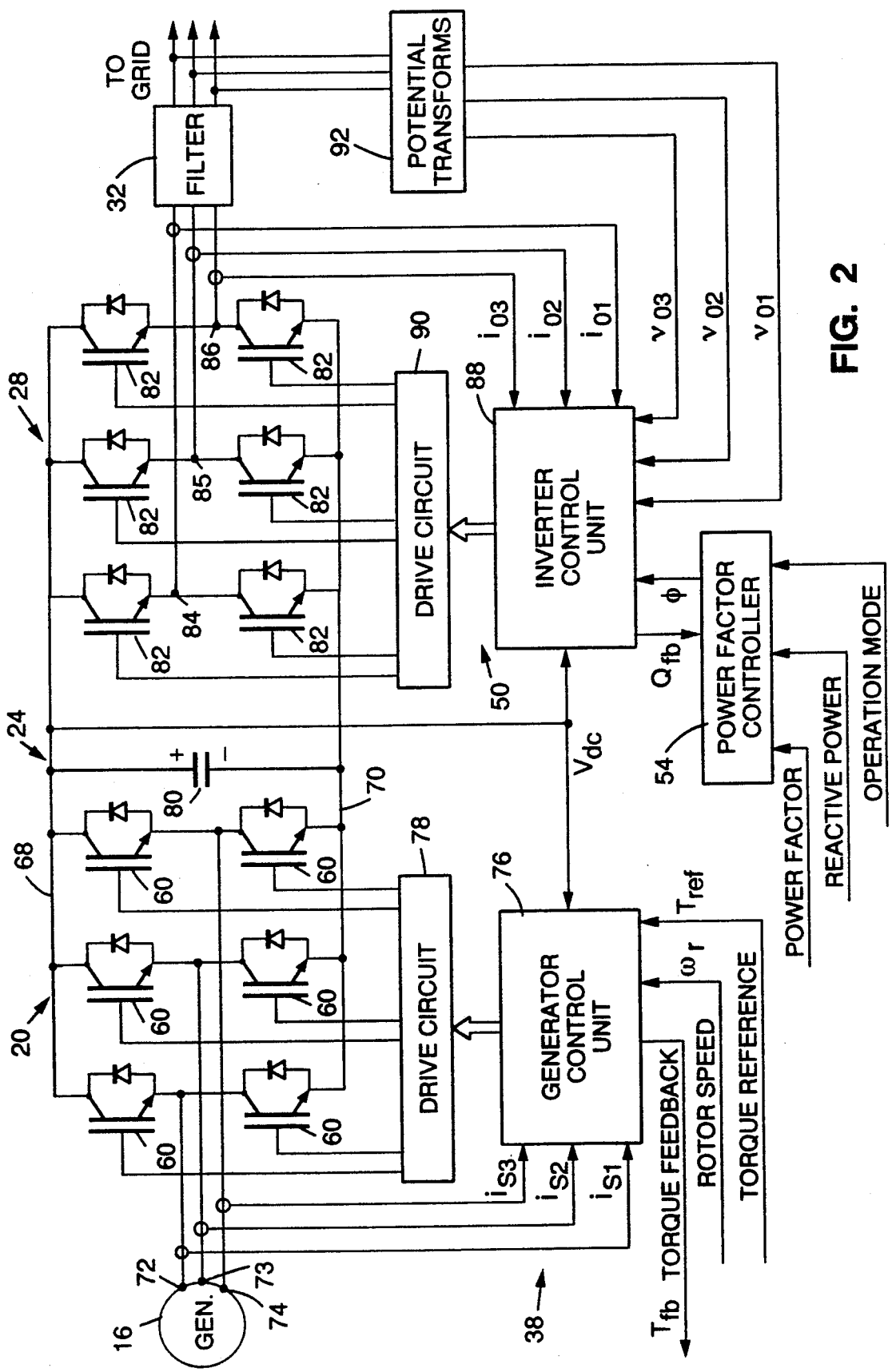
FIG. 2 is a schematic diagram of a power converter circuit and block diagram of associated control circuits of the present invention.

Broadly speaking, the power converter for each generator includes an active rectifier, a DC voltage link, an inverter, filters, and associated controls. Both power converters are identical; only one will be explained. More particularly, as illustrated in FIG. 2, the active rectifier 20 includes three pairs of active switching devices 60 arranged in a bridge circuit between a +DC rail 68 and a −DC rail 70 of the DC voltage link 24 and each of three stator power taps 72-74 of the generator 16. Each pair of switching devices is coupled between the DC rails 68 and 70, and connected at an intermediate point to one of the stator power taps. Commutation signals that cause the active switching devices to switch on and off originate in a generator control unit 76, which supplies the signals to the switching devices through a drive circuit 78. The generator control unit 76 and drive circuit 78 are isolated from the rectifier 20 by optical isolators to minimize interference. The commutation signals are complementary for each pair of switching devices, causing one switching device of each pair to switch on and the other switching device of the pair to switch off, as appropriate to achieve the desired stator currents or voltages. The switching devices 60 of the rectifier 20 control the stator currents and voltages in the three phase stator windings.

The switching devices 60 of the rectifier can be any of a number of different types of active switches, including insulated gate bipolar transistors (IGBT), bipolar junction transistors, field effect transistors, Darlington transistors, gate turn-off thyristors, or silicon controlled rectifiers. In the preferred embodiment, the switching devices 60 of the rectifier are IGBT's, with two IGBT's connected in parallel for each one shown in FIG. 2, for a total of twelve devices in the rectifier 20.

The generator control unit 76, which is part of the generator controller 38, receives sensor inputs of the stator currents $i_{s1}$, $i_{s2}$, $i_{s3}$, and rotor speed $\omega_r$, receives a torque reference value $T_{ref}$ from the torque command device 46 (FIG. 1), and generates pulse width modulated (PWM) commutation signals that it supplies to the rectifier switches 60 through the drive circuit 78. Although FIG. 2 shows sensing of all three stator currents, only two currents need to be sensed because the third can be found from the relationship $i_{s1} + i_{s2} + i_{s3} = 0$. The operation of the generator control unit 76 will be explained in further detail below.

The DC voltage link 24 consists simply of the two rails 68 and 70, plus a energy storage capacitor 80 connected between the two rails. In the preferred embodiment, where each generator is rated at 150 kilowatts, the capacitance of the capacitor 80 is about 15,000 microfarads, and the nominal voltage of the DC link is about 750 volts.

Situated on the other side of the DC voltage link from the active rectifier 20, the inverter 28 also includes three pairs of active switching devices 82 arranged in a bridge circuit between the +DC rail 68 and −DC rail 70 of the DC voltage link 24. The intermediate points of the pairs of active switching devices 82 form three output taps 84-86 from which three phase electricity flows through the filters 32 and transformer 36 to the utility grid. Commutation signals for the active switching devices 82 originate in an inverter control unit 88, which supplies the signals to the switching devices through a drive circuit 90. The inverter control unit 88 and drive circuit 90 are isolated from the inverter 28 by optical isolators. The commutation signals are complementary for each pair of switching devices, causing one switching device of each pair to switch on and the other switching device of the pair to switch off at any given time. In the preferred embodiment, the switching devices 82 of the inverter 28 consist of twelve IGBT's arranged in parallel pairs, like the switching devices 60 of the rectifier.

The inverter control unit 88, which is part of the inverter controller 50, receives sensor inputs of the inverter currents $i_{o1}$, $i_{o2}$, $i_{o3}$, inverter voltages $v_{o1}$, $V_{o2}$, $V_{o3}$, and DC link voltage $v_{dc}$. The inverter currents are sensed at the output taps, while the inverter voltages are sensed at the output of the filters 32 and are isolated through potential transformers 92. The inverter control unit 88 also receives, from the power factor controller 54, a power factor signal, a reactive power signal, and an operation mode signal, which define the desired power factor. In response, as will be explained in further detail below, the inverter control unit 88 generates pulse width modulated commutation signals and supplies them to the inverter switches 82 through the drive circuit 90. In addition, the inverter control unit 88 also supplies a feedback signal, $Q_{fb}$, to the power factor controller 54 that indicates the reactive power being supplied by the inverter 50.

Figure 3:
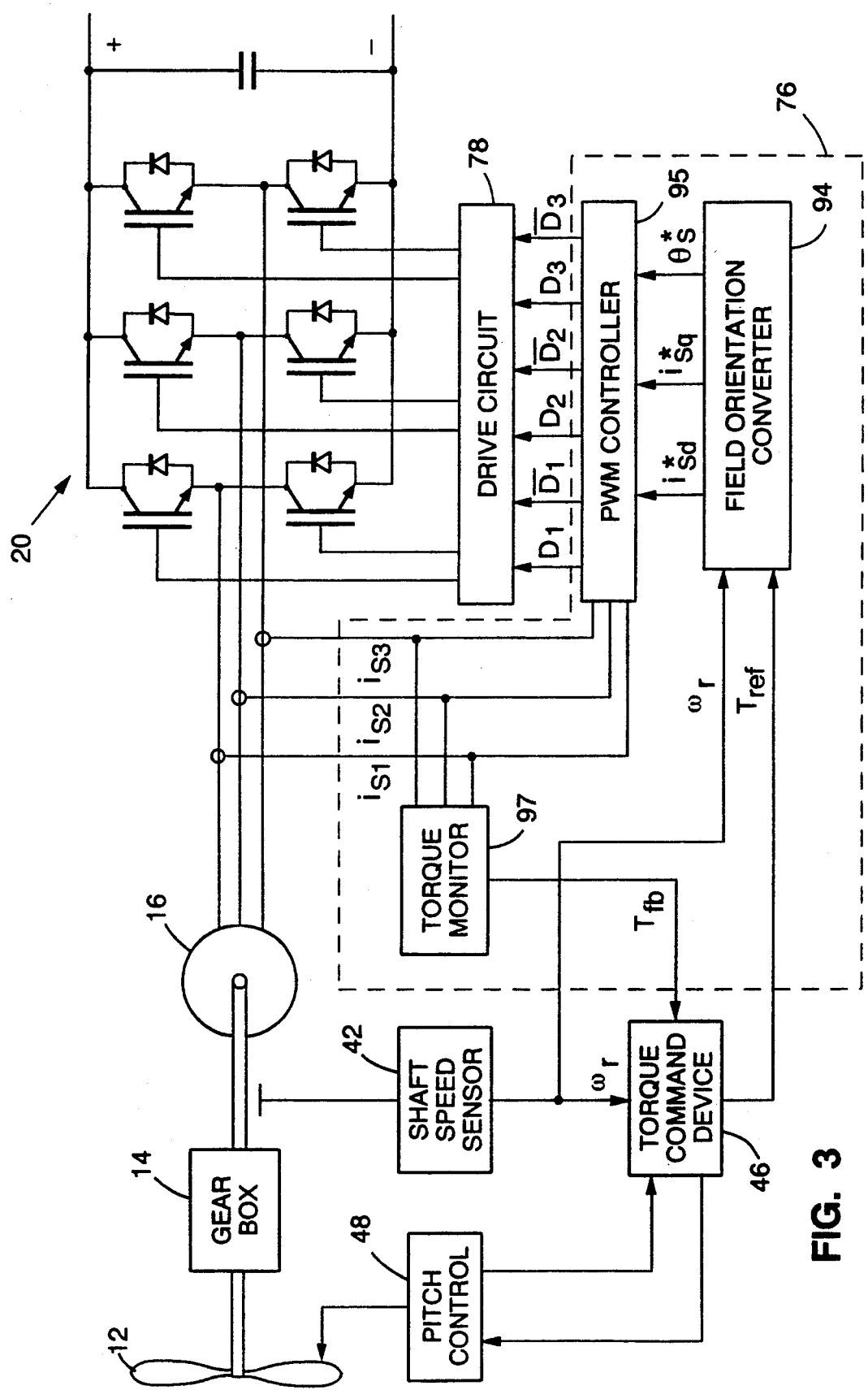
FIG. 3 is a block diagram of the control system used to control generator torque.

The control structure of the wind turbine is illustrated in FIG. 3 for one of the generators 16. The generator control unit 76 includes a field orientation converter 94 that converts the torque reference, $T_{ref}$, and the rotor speed, $\omega_r$, into field oriented control currents, $i_{sd}$ and $i_{sq}$, and a rotor flux angle, $\theta_s$. These control variables, which are identified as control variables by the * superscript, are used by a PWM controller 95 along with the sensed 3 phase stator currents, $i_{s1}$, $i_{s2}$, $i_{s3}$, to generate the PWM commutation signals, $D_1$, $\overline{D}_1$, $D_2$, $\overline{D}_2$, $D_3$, $\overline{D}_3$. The notation $D_n$ and $\overline{D}_n$, for example, refers to the base drive signals for the upper ($D_n$) and lower ($\overline{D}_n$) devices of one pair of rectifier switches 60. The PWM controller 95, as will be described in more detail below, controls stator electrical quantities, either the stator currents or the stator voltages, depending on the rotor speed. A torque monitor 97 monitors the stator currents, generates a signal indicative of actual torque, $T_{fb}$, and feeds it back to the torque command device 46.

Controlling the generator currents and voltages in terms of field coordinates is a key element of the present invention. The electric torque of an AC induction machine can be expressed in terms of the stator and rotor currents, but such an expression is difficult to use in a torque control system since the rotor currents of a squirrel-cage induction generator cannot be directly measured. Field orientation control eliminates that difficulty.

Figure 4:
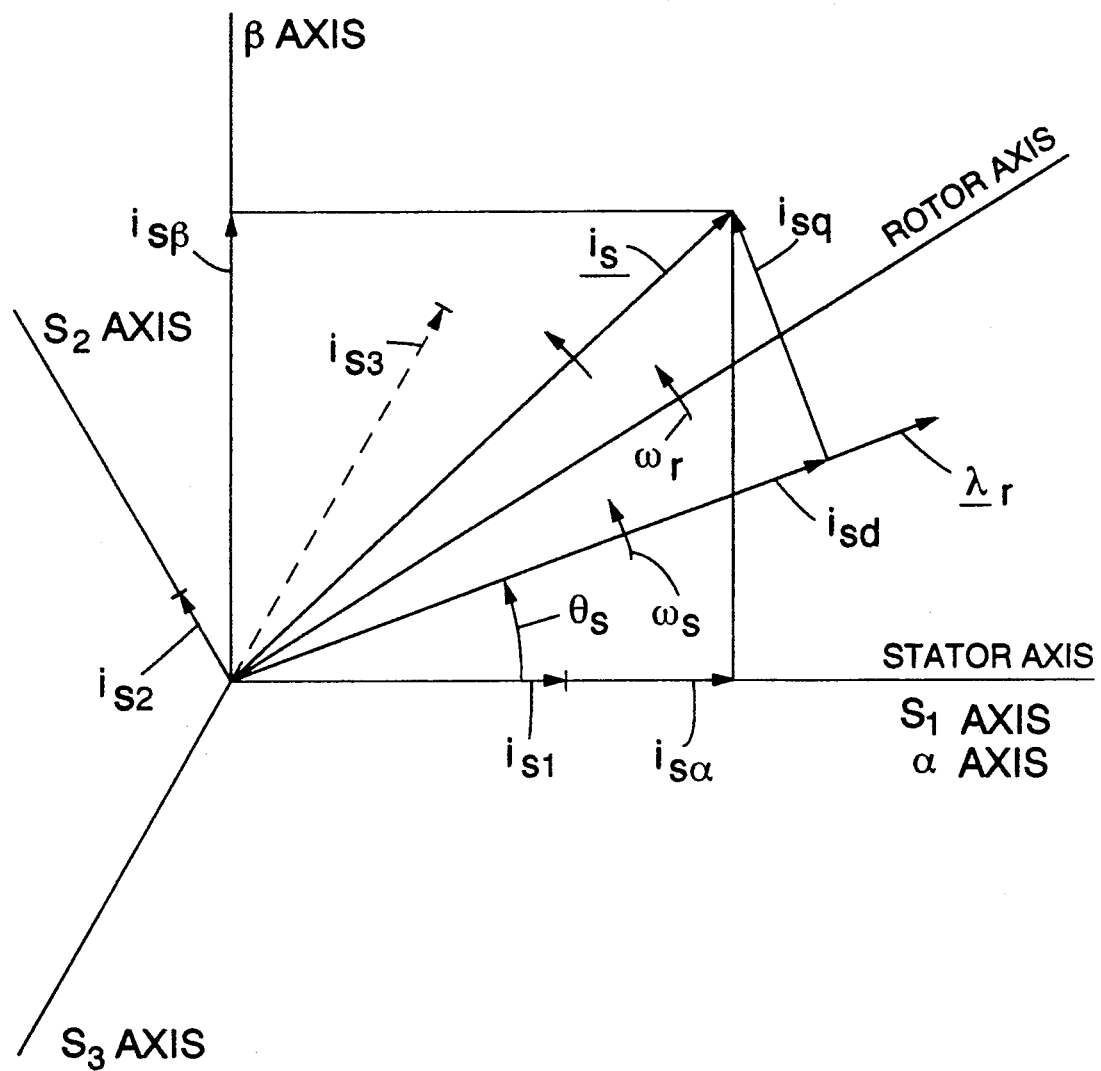
FIG. 4 is a graphical diagram illustrating the angular relationships between a fixed stator coordinate system, a rotating rotor coordinate system, and a rotating field oriented coordinate system.

It is important to understand that, at any instant of time, the rotor flux of an induction machine can be represented by a radial vector $\lambda_r$ with magnitude $\lambda_r$ and angle $\theta_s$. The field orientation principle defines the stator current in terms of a rotating d,q coordinate system, where a direct (d) axis is aligned with the instantaneous rotor flux vector $\lambda_r$ at angle $\theta_s$ and a quadrature (q) axis is perpendicular to the rotor flux vector. This is illustrated in FIG. 4. The stator current vector, $i_s$, can be degenerated into a component, $i_{sd}$, that is parallel to the rotor flux $\lambda_r$ vector and a component, $i_{sq}$, that is perpendicular to the rotor flux vector. The currents $i_{sd}$ and $i_{sq}$ at angle $\theta_s$ are the field coordinate representation of the stator current vector.

FIG. 4 also illustrates that $\omega_r$ is defined as the rotor angular speed and $\omega_s$ is defined as the angular speed of the rotor flux vector. The machine slip speed, $\omega_{sl}$, which is the speed of the stator current vector with respect to the rotor, is the difference between $\omega_s$ and $\omega_r$.

The d,q coordinate system isolates or decouples a current that creates the rotor flux field, $i_{sd}$, on the direct axis, from a current that creates torque, $i_s$, on the quadrature axis. Defining the generator currents in field orientation coordinates permits the generator control unit 76 to convert the torque control commands directly into a desired quadrature axis current, $i_{s1}$, which is then used by the PWM controller 95 to carry out the torque commands of the torque command device 46.

Controlling the generator in this manner requires conversion between stationary stator coordinates and rotating field coordinates. The stator currents in a balanced, 3-phase coordinate system, as represented by the currents on the three stator power taps 72–74 (FIG. 2), can be designated by the variables $i_{s1}$, $i_{s2}$, and $i_{s3}$. The balanced, 3-phase stator currents are equivalent to 2 phase stator currents, $i_{s\alpha}$ and $i_{s\beta}$, defined by the following matrix equation:

$$\begin{bmatrix} i_{s\alpha} \\ i_{s\beta} \\ 0 \end{bmatrix} = \begin{bmatrix} 1 & \cos(2\pi/3) & \cos(4\pi/3) \\ 0 & \sin(2\pi/3) & \sin(4\pi/3) \\ 1 & 1 & 1 \end{bmatrix} \begin{bmatrix} i_{s1} \\ i_{s2} \\ i_{s3} \end{bmatrix} \quad (1)$$

The 2 phase stator currents, $i_{s\alpha}$ and $i_{s\beta}$, can be converted into the field coordinate currents, $i_{sd}$ and $i_{sq}$, as a function of the rotor flux angle, $\theta_s$, by the following transformation:

$$\begin{bmatrix} i_{sd} \\ i_{sq} \end{bmatrix} = \begin{bmatrix} \cos\theta_s & \sin\theta_s \\ -\sin\theta_s & \cos\theta_s \end{bmatrix} \begin{bmatrix} i_{s\alpha} \\ i_{s\beta} \end{bmatrix} \quad (2)$$

Transformation from field coordinates to 2 phase coordinates is accomplished by inverting equation (2), which results in the following:

$$\begin{bmatrix} i_{s\alpha} \\ i_{s\beta} \end{bmatrix} = \begin{bmatrix} \cos\theta_s & -\sin\theta_s \\ \sin\theta_s & \cos\theta_s \end{bmatrix} \begin{bmatrix} i_{sd} \\ i_{sq} \end{bmatrix} \quad (3)$$

Transformation from 2-phase to balanced 3-phase coordinates is found by inverting equation (1):

$$\begin{bmatrix} i_{s1} \\ i_{s2} \\ i_{s3} \end{bmatrix} = \begin{bmatrix} 2/3 & 0 & 1/3 \\ -1/3 & 1/\sqrt{3} & 1/3 \\ -1/3 & -1/\sqrt{3} & 1/3 \end{bmatrix} \begin{bmatrix} i_{s\alpha} \\ i_{s\beta} \\ 0 \end{bmatrix} \quad (4)$$

Representations of the stator current vector in the rotating d,q field coordinate system, in the stationary 2-phase $\alpha,\beta$ coordinate system, and in the stationary balanced 3-phase coordinate system are shown in FIG. 4.

Figure 5:
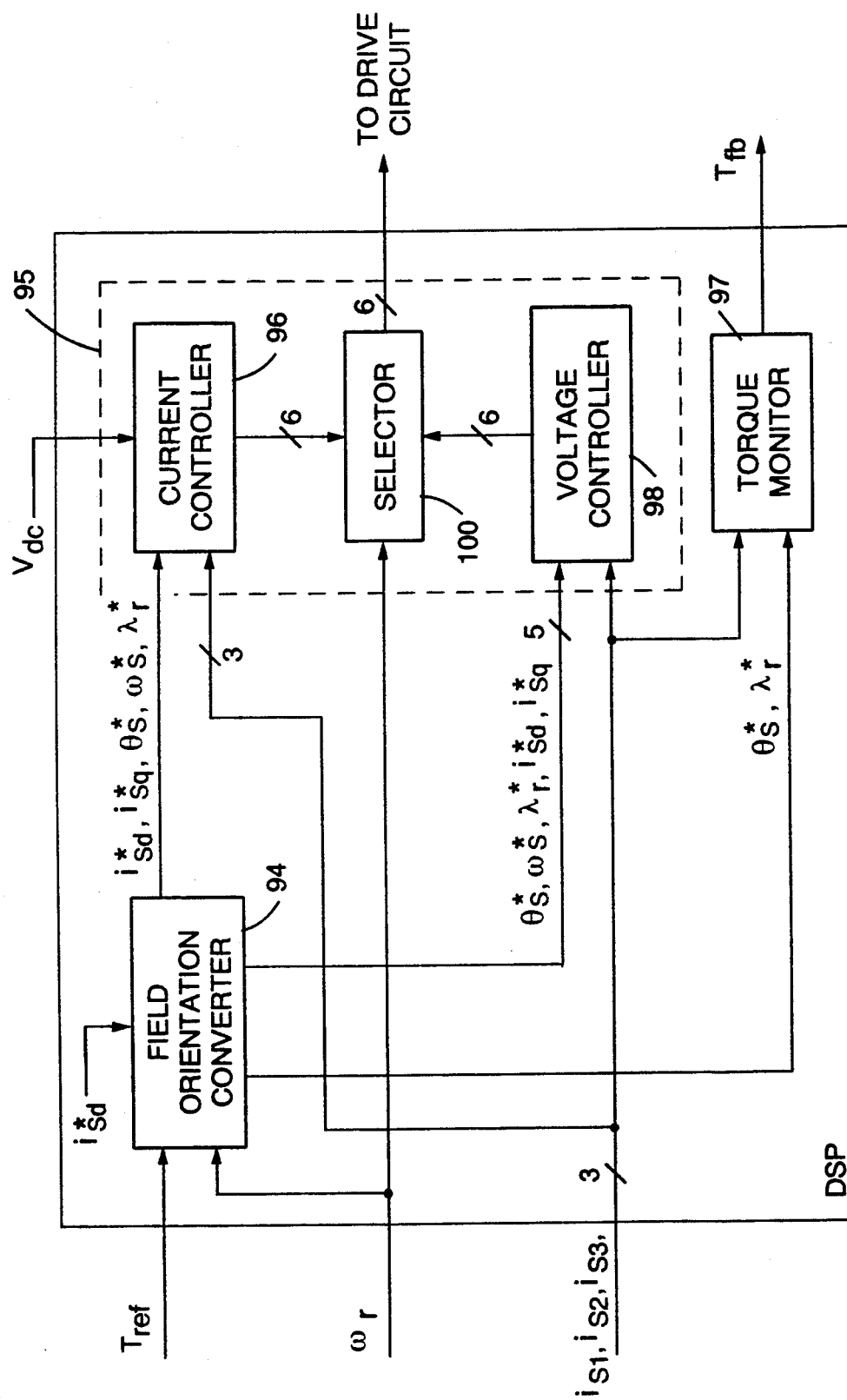
FIG. 5 is a block diagram of a generator control unit of the present invention.

The structure of the generator control unit 76 is shown in block diagram form in FIG. 5. The generator control unit is preferably implemented in a digital signal processor ("DSP"), a Texas Instruments model TMS320C25. Computer code for implementing the invention in a DSP is disclosed in the microfiche appendix.

Functionally, the generator control unit 76 includes the field orientation converter 94, the torque monitor 97, and the PWM controller 95. In the preferred embodiment, the PWM controller 95 includes a current controller 96, a voltage controller 98, and a selector circuit 100. These components will be explained in more detail below, but generally, the field orientation converter 94 generates control parameters based on the rotor speed and torque reference signals, the current controller 96 or the voltage controller 98 generates PWM commutation signals for the active switching devices 60, and the selector circuit 100 chooses which of the PWM commutation signals to output to the drive circuit 78. The torque monitor 97 senses the actual stator currents, $i_{s1}$, $i_{s2}$, $i_{s3}$, converts them to field coordinate values using equations (1) and (2), and calculates a torque signal, $T_{fb}$, using equation (8) (see below) for feedback to the torque command device 46. The torque monitor 97 thus infers generator torque from the measured currents. The computations performed within the DSP of the generator control unit 76 are digital, which requires A/D conversion of the external signals.

Figure 6:
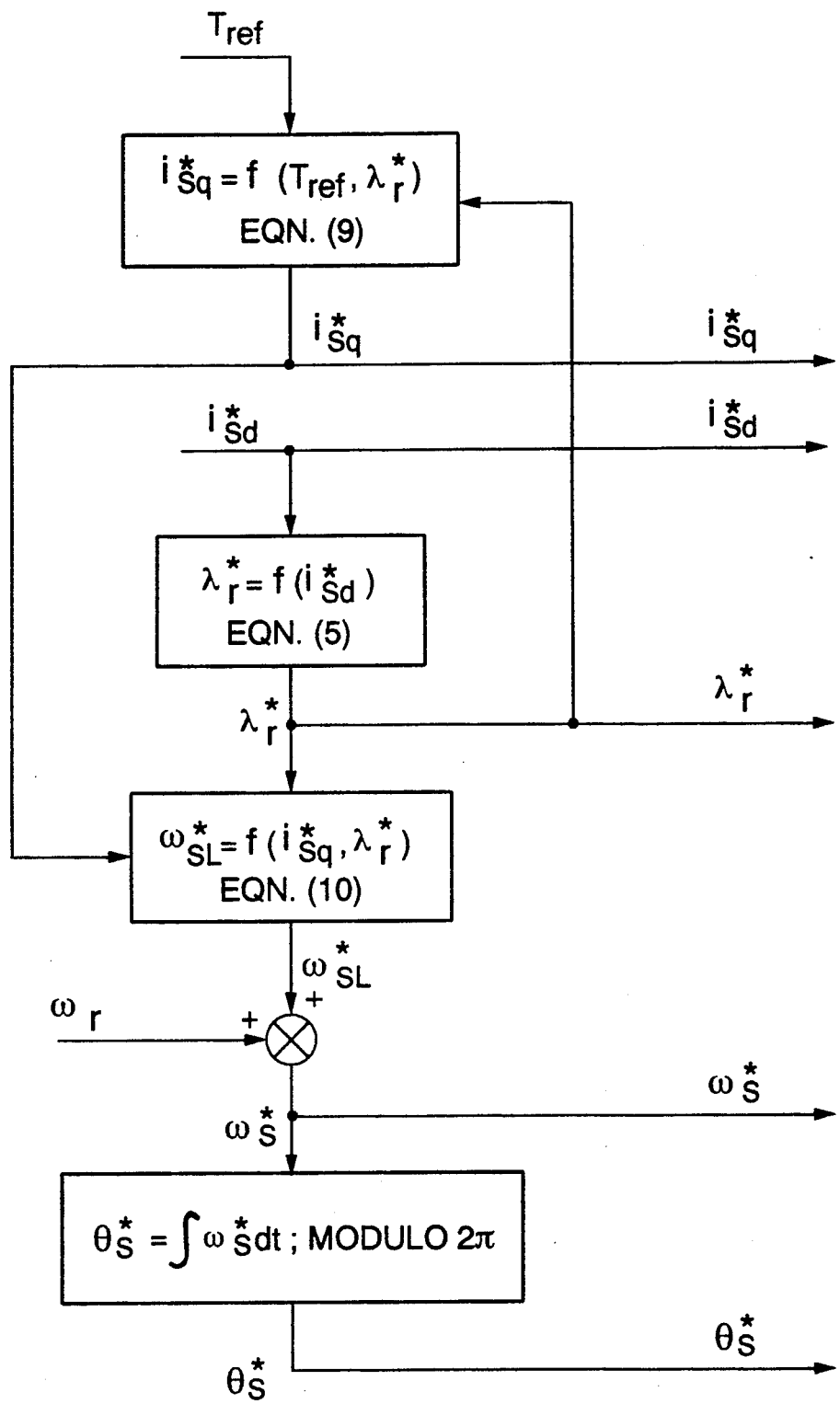
FIG. 6 is a block diagram of a field orientation converter of the present invention.

The field orientation converter 94, illustrated in FIG. 6, converts the torque control and rotor flux signals into field coordinates. Using a desired direct axis current, $i_{sd}$, the field orientation converter 94 computes the desired magnitude of the rotor flux, $\lambda_r$. The desired flux-producing direct axis current, $i_{sd}$, is a function of the particular generator used, and can be predetermined and stored in the DSP. In the preferred embodiment, $i_{sd}$ is assumed to be constant. Alternatively, $i_{sd}$ can be varied to provide field weakening control, if desired. The notation * designates a desired value generated by the control system as opposed to an actual value.

The desired rotor flux, $\lambda_r$, is defined by the following equation:

$$\dot{\lambda}_r{}^* = \frac{-R_r \lambda_r{}^*}{L_r} + \frac{R_r L_o i_{sd}{}^*}{L_r} \tag{5}$$

where:
$\lambda_r$ = desired rotor flux;
$\dot{\lambda}_r$ = time derivative of desired rotor flux;
$R_r$ = rotor resistance;
$L_o$ = mutual inductance;
$L_r$ = rotor self inductance.

In the general case, equation (5) can be represented by the following recursive equation:

$$\lambda_{r(k)}{}^* = \lambda_{r(k-1)}{}^* - \frac{\Delta t\, R_r \lambda_{r(k-1)}{}^*}{L_r} + \frac{\Delta t\, R_r L_o\, i_{sd(k-1)}{}^*}{L_r} \tag{6}$$

where: $\lambda_{r(k)} = \lambda_r$ at time=k;
$\lambda_{r(k-1)} = \lambda_r$ at time=k−1;
$i_{sd(k-1)} = i_{sd}$ at time=k−1;
$\Delta t$=sample time period between time=k−1 and time=k.

In the case where $i_{sd}$ is constant, the time derivative $\dot{\lambda}_r = 0$, so that equation (6) simplifies to:

$$\lambda_r = L_o i_{sd} \tag{7}$$

Once the rotor flux is known, the torque reference can be converted into quadrature axis current. In field coordinates, the torque reacted by the generator is given by:

$$T = \frac{P L_o \lambda_r i_{sq}}{3 L_r} \tag{8}$$

where: T = generator torque;
P = number of generator poles;
$i_{sq}$ = quadrature axis current.

Solving equation (8) for $i_{sq}$, yields the following expression for desired torque-producing quadrature axis current as a function of the torque reference supplied by the torque command device 46:

$$i_{sq}{}^* = \frac{3 L_r T_{ref}}{P L_o \lambda_r{}^*} \tag{9}$$

where $T_{ref}$ is the torque reference signal supplied to the generator control unit by the torque command device 46.

Once the desired rotor flux, $\lambda_r$, and desired quadrature axis current, $i_{sq}$, have been determined, the desired rotor flux angle, $\theta_s$, at a particular instant of time can be found. This is accomplished by solving the following equations:

$$\omega_{sl}{}^* = \frac{R_r L_o i_{sq}{}^*}{L_r \lambda_r{}^*} \tag{10}$$

$$\omega_s = \omega_r + \omega_{sl} \tag{11}$$

$$\theta_s = \int \omega_s dt,\ 0 \leq |\theta_s| \leq 2\pi \tag{12}$$

where:
$\omega_{sl}$ = desired machine slip speed;
$\omega_s$ = desired rotor flux speed;
$\omega_r$ = actual rotor speed;
$\theta_s$ = desired instantaneous rotor flux angle.

Machine slip speed, $\omega_{sl}$, is found from the calculated values of desired rotor flux, $\lambda_r$, and desired quadrature axis current, $i_{sq}$, using equation (10). The measured rotor speed, $\omega_r$, is then added to the machine slip speed, $w_{sl}$, to find the desired rotor flux speed, $\omega_s$, according to equation (11). The desired rotor flux speed, $\omega_s$, is then integrated modulo $2\pi$ to find the desired instantaneous rotor flux angle, $\theta_s$.

The computed values for desired field oriented currents, $i_{sd}$ and $i_{sq}$, rotor flux, $\lambda_r$, rotor flux speed, $\omega_s$, and rotor flux angle, $\theta_s$, are available to the current and voltage controllers 96 and 98 (FIG. 5) for determination of the PWM commutation signals. Transformation of the desired stator currents from field coordinates into stationary 2-phase $\alpha, \beta$ coordinates or balanced 3-phase coordinates, if required by the PWM controller, can be accomplished either in the field orientation converter or in the PWM controller. Here, it is assumed that the transformations occur outside of the field orientation converter 94.

In response to the values computed by the field orientation converter 94, either the current controller 96 or the voltage controller 98, depending on which is selected, determines switch states for the active switching devices (FIG. 5). The current controller 96 generates PWM commutation signals by choosing a switch state that causes stator currents to approximate the desired currents defined by the field orientation converter. The voltage controller 98 generates PWM commutation signals by converting the desired field oriented currents into desired field oriented voltages, transforming them into stator coordinates, and then selecting the appropriate switch state to obtain the desired stator voltages.

Figure 7:
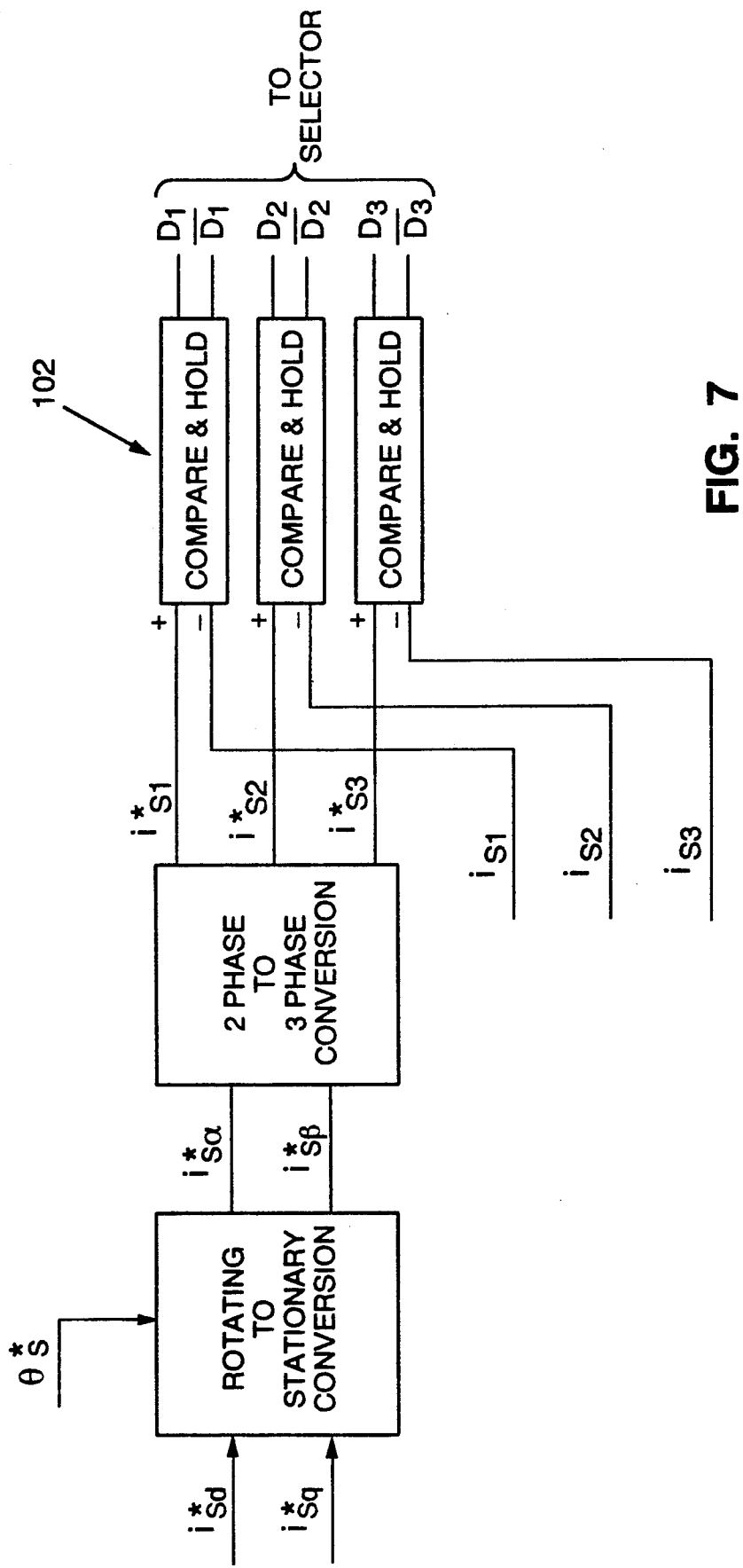
FIG. 7 is a block diagram of a delta modulator current controller of the present invention.

One simple method of current control is illustrated in FIG. 7, a delta modulator current controller. The delta modulator current controller converts the desired field oriented currents into stationary 2-phase stator coordinates, and then to 3-phase stator coordinates to generate desired 3-phase stator currents, $i_{s1}$, $i_{s2}$, $i_{s3}$.

Transforming the desired currents from rotating field coordinates to stationary 2-phase $\alpha,\beta$ coordinates is achieved by equation (3), which reduces to the following:

$$i_{s\alpha} = i_{sd} \cos\theta_s - i_{sq} \sin\theta_s \qquad (13)$$

$$i_{s\beta} = i_{sd} \sin\theta_s + i_{sq} \cos\theta_s \qquad (14)$$

The desired stator currents are then transformed into 3-phase coordinates using equation (4).

After converting the desired stator currents from field coordinates into 3-phase coordinates, the delta modulator current controller then periodically compares each desired stator current $i_{s1}$, $i_{s2}$, $i_{s3}$, with the corresponding actual stator current $i_{s1}$, $i_{s2}$, $i_{s3}$, using compare and hold devices 102. If the desired stator current for a phase is greater than the actual stator current, then the upper switching device is switched on and the lower switching device switched off, otherwise, the upper device is switched on and the lower device is switched off. The compare and hold devices 102 set the PWM commutation signals, $D_1$, $\overline{D}_1$, $D_2$, $\overline{D}_2$, $D_3$, $\overline{D}_3$ to accomplish the desired switching. The switch state so selected remains in effect until the next sample period occurs, at which time the comparisons are performed with updated actual and desired values.

Figure 8:
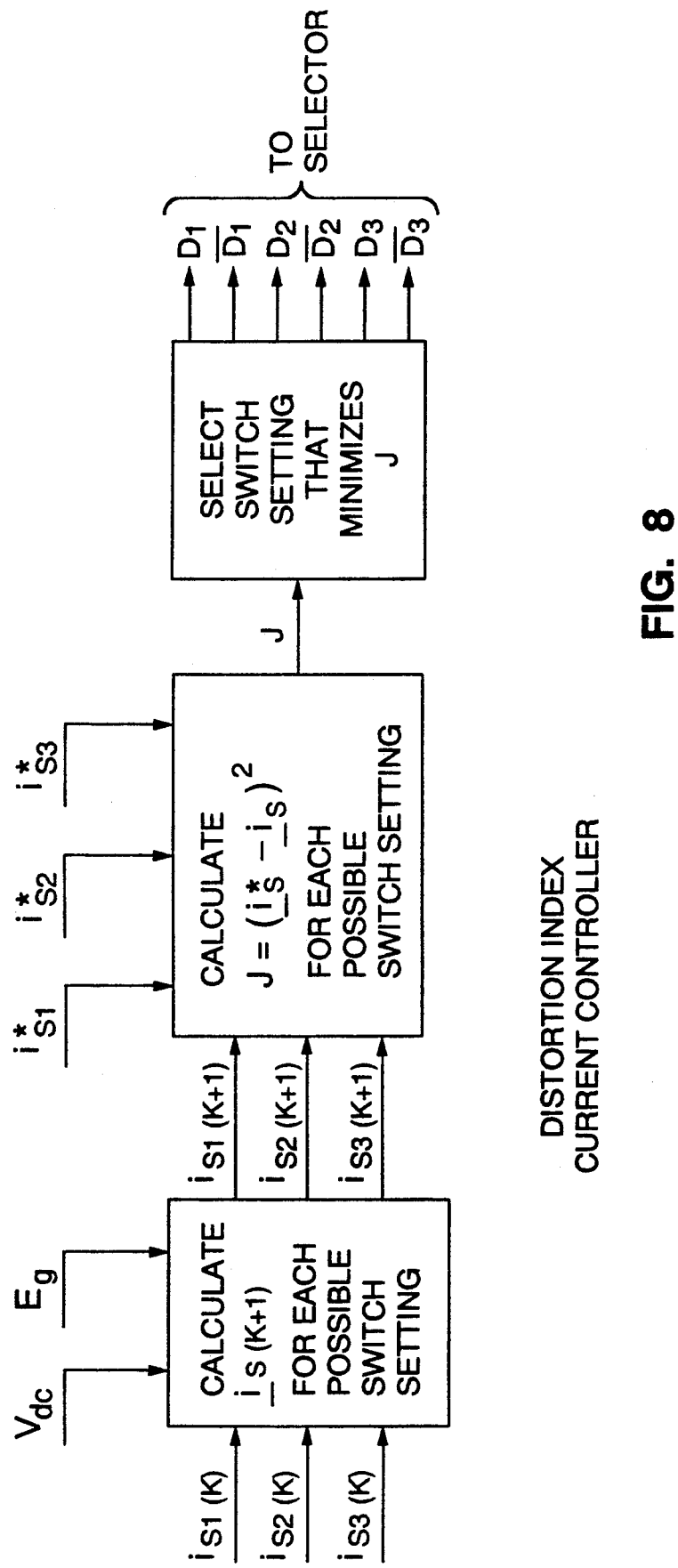
FIG. 8 is a block diagram of a distortion index current controller of the present invention.
Figure 9:
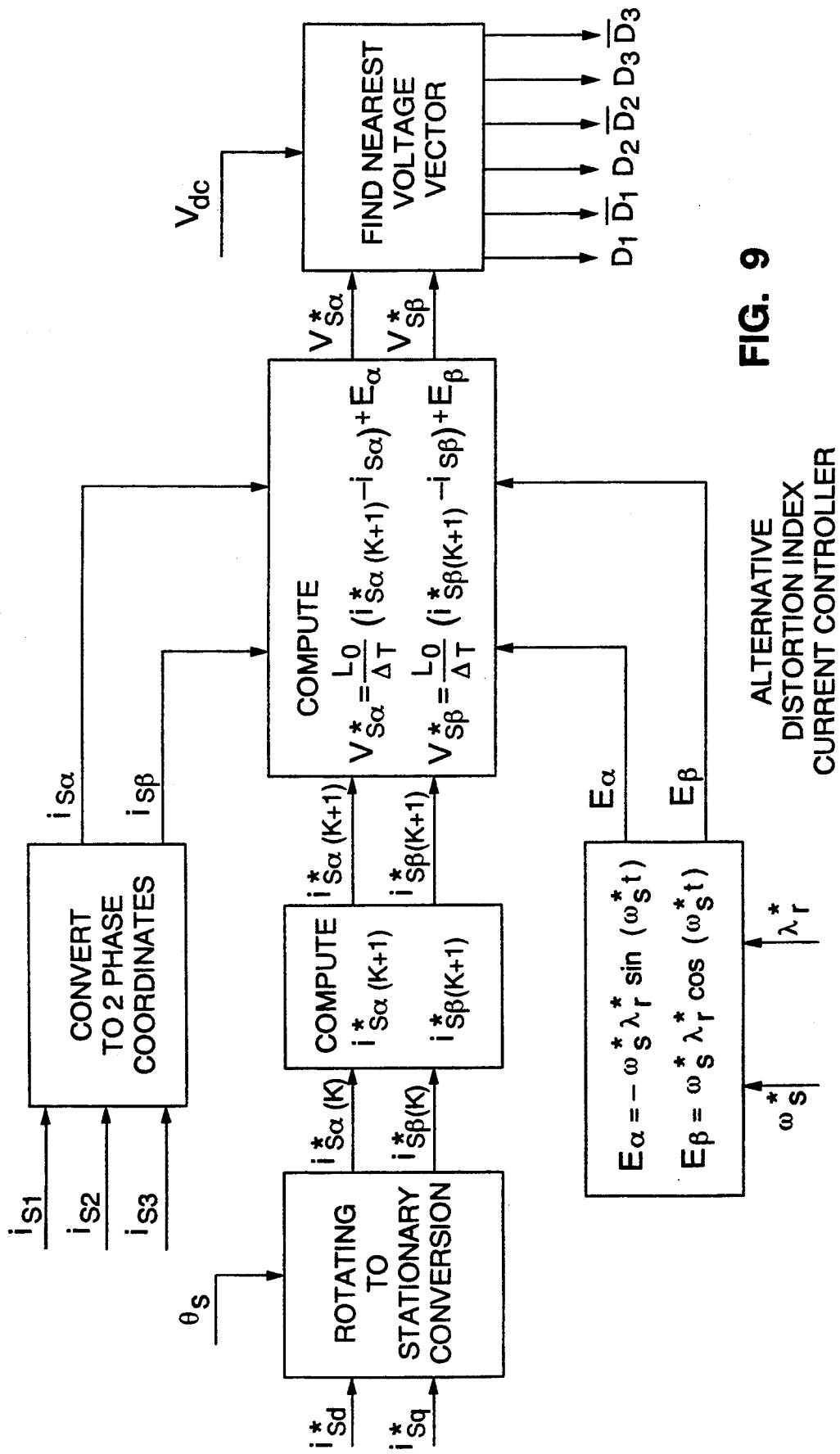
FIG. 9 is a block diagram of an alternative implementation of the distortion index current controller of FIG. 8.
Figure 10:
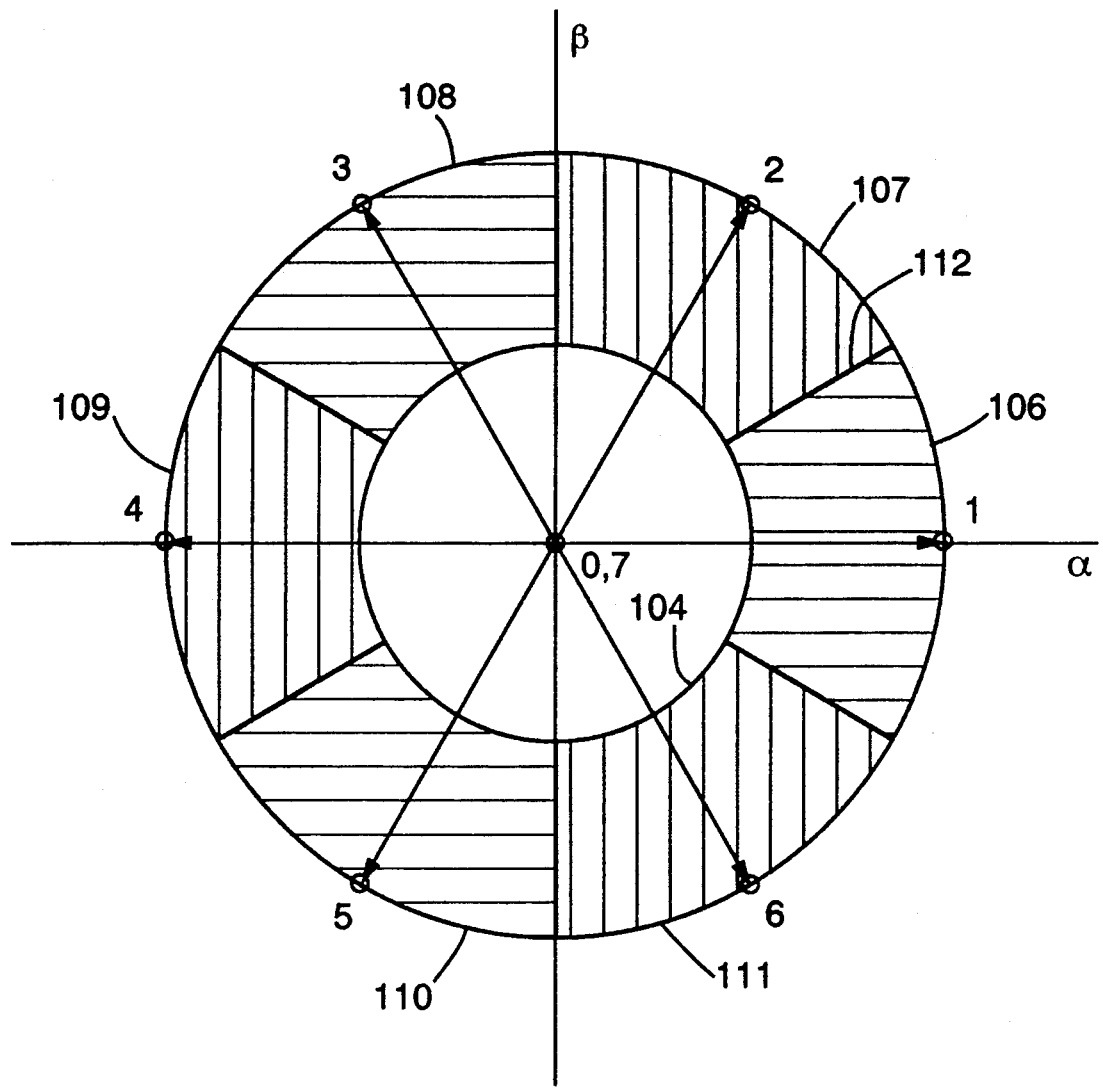
FIG. 10 is a graphical representation, in $\alpha$, $\beta$ coordinates, of voltage vectors resulting from eight possible switch states of the active rectifier.

Another method of current control, one that minimizes a distortion index, is illustrated in FIGS. 8-10. This method generates PWM signals by periodically minimizes a distortion index related directly to total harmonic distortion (THD). In comparison with the delta modulator current controller or with a linear controller with triangular crossing, this method is preferable due to lower THD at comparable frequencies, while requiring fewer switching events and, consequently, less power loss due to switching. The distortion index that is minimized may be defined as the sum of the squares of the current errors:

$$J_1 = (i_{s1} - i_{s1})^2 + (i_{s2} - i_{s2})^2 + (i_{s3} - i_{s3})^2 \qquad (15)$$

where, $i_{s1}$, $i_{s2}$, $i_{s3}$ are the desired 3-phase stator currents, and $i_{s1}$, $i_{s2}$, $i_{s3}$ are the actual 3-phase stator currents. Alternatively, the distortion index can be defined as the sum of the absolute values of the current errors.

$$J_2 = |i_{s1} - i_{s1}| + |i_{s2} - i_{s2}| + |i_{s3} - i_{s3}| \qquad (16)$$

Minimizing the distortion index, J, involves determining which of eight possible switch states of the rectifier switches will produce actual stator currents nearest in value to the desired stator currents. One way to accomplish this is shown in FIG. 8. Switching decisions are made periodically, based on the most recently measured stator currents. The actual stator currents $i_{s1(k)}$, $i_{s2(k)}$, and $i_{s3(k)}$, are measured at time=k, and a projection is made of the stator currents $i_{s1(k+1)}$, $i_{s2(k+1)}$, and $i_{s3(k+1)}$ at the next interval of time, for each possible switch state. Since there are two possible switch settings for each of the three switch pairs, there are eight ($2^3$) possible switch states for the rectifier switches. The projected stator currents $i_{s1(k+1)}$, $i_{s2(k+1)}$, and $i_{s3(k+1)}$ are found by modeling the generator and rectifier according to the following equation derived from a simplified model:

$$\underline{V} = \underline{E} + L_o \frac{d}{dt}(\underline{i}_s) \qquad (17)$$

where $\underline{V}$ = voltage vector resulting from a particular switch state;
$\underline{E}$ = generator emf vector;
$\underline{i}_s$ = stator current vector.

Evaluating the derivative over a discrete time interval, $\Delta t$, yields the following for the projected currents:

$$i_{s(k+1)} = \frac{\Delta t}{L_o} (V_{(k)} - E_{(k)}) + i_{s(k)} \qquad (18)$$

The projected stator currents can thus be found for each switch state by evaluating equation (18) using the voltage vector that would result from that switch state.

After the projected stator currents are found, the distortion index, J, can be computed by equations (15) or (16) for each possible switch state. The switch state that yields the minimum value of J is output to the selector 100.

While the above-described method will define a switch state that minimizes the distortion index, another equivalent method is preferable due to its reduced computational overhead. The alternative method of computing the switch state that minimizes the distortion index is illustrated in FIGS. 9 and 10. This method converts the desired stator current vector into an equivalent desired voltage vector, and then finds the switch state that would most closely approximate the desired voltage vector. This method in effect minimizes an equivalent distortion index defined in the $\alpha,\beta$ coordinate system with respect to voltage error:

$$J_3 = (v_{s\alpha} - v_{s\alpha})^2 + (v_{s\beta} - v_{s\beta})^2 \qquad (19)$$

or $$J_4 = |v_{s\alpha}31\ v_{s\alpha}| + |v_{s\beta} - v_{s\beta}| \qquad (20)$$

where $v_{s\alpha}$ = desired $\alpha$ axis voltage;
$V_{s\beta}$ = desired $\beta$ axis voltage;
$V_{s\alpha}$ = actual $\alpha$ axis voltage;
$V_{s\beta}$ = actual $\beta$ axis voltage.

It can be shown that minimizing the voltage differences of equations (19) or (20) is equivalent to minimizing the current differences of equations (15) or (16), since the distortion indices vary only by constant or proportional factors. Due to this equivalence, minimizing the distortion index defined by equations (19) or (20) does control the stator currents, even though the desired currents are converted into desired voltages for evaluating the distortion index.

As shown in FIG. 9, computations are carried out using the 2-phase $\alpha,\beta$ coordinate system instead of the 3-phase coordinate system in order to eliminate some redundant computational steps. The measured 3 phase stator currents, $i_{s1}$, $s_{s2}$, and $i_{s3}$, are converted into the 2-phase $\alpha,\beta$ coordinate system using equation (1). The desired field coordinate currents, $i_{sd}$ and $i_{sq}$, as received from the field orientation converter 94 (FIG. 5), are converted into desired $\alpha,\beta$ stator currents at time (k), $i_{s\alpha(k)}$ and $i_{s\beta(k)}$, using equation (3). These values are projected forward in time using the formulas:

$$i_{s\alpha(k+1)} = 2\, i_{s\alpha(k)} - i_{s\alpha(k-1)} \quad (21)$$

$$i_{s\beta(k+1)} = 2\, i_{s\beta(k)} - i_{s\beta(k-1)} \quad (22)$$

The generator emf, in $\alpha,\beta$ coordinates, is estimated by:

$$E_\alpha = \lambda_r d/dt\ (\cos\theta_s) = -\omega_s \lambda_r \sin(\omega_s t) \quad (23)$$

$$E_\beta = d/dt\ (\sin\theta_s) = \omega_s \lambda_r \cos(\omega_s t) \quad (24)$$

The desired voltages in $\alpha,\beta$ coordinates, $v_{s\alpha}$ and $v_{s\beta}$, are estimated by the generator model of equation (17), which defines the following equations:

$$v_{s\alpha}^* = \frac{L_0\,(i_{s\alpha(k+1)}^* - i_{s\alpha})}{\Delta t} + E_\alpha \quad (25)$$

$$v_{s\beta}^* = \frac{L_0\,(i_{s\beta(k+1)}^* - i_{s\beta})}{\Delta t} + E_\beta \quad (26)$$

Next, instead of solving equation (19) or (20) for each possible switch state, the desired $\alpha$ and $\beta$ axis voltages, $v_{s\alpha}$ and $v_{s\beta}$, are compared to the limited number of voltage vectors that could result from the eight possible switch states. These voltage vectors, shown in FIG. 10, have a magnitude of either zero or the DC link voltage, $V_{dc}$, and are aligned with the $s_1$, $s_2$, and $s_3$ axes. The voltage vectors are defined according to the following table:

| State | Switch Setting | $(v_{s\alpha}, v_{s\beta})$ |
|---|---|---|
| 0 | $[\overline{D}_1, \overline{D}_2, \overline{D}_3]$ | $v_{dc}\,(0, 0)$ |
| 1 | $[D_1, \overline{D}_2, \overline{D}_3]$ | $v_{dc}\,(1, 0)$ |
| 2 | $[D_1, D_2, \overline{D}_3]$ | $v_{dc}\,(1/2, \sqrt{3}/2)$ |
| 3 | $[\overline{D}_1, D_2, \overline{D}_3]$ | $v_{dc}\,(-1/2, \sqrt{3}/2)$ |
| 4 | $[\overline{D}_1, D_2, D_3]$ | $v_{dc}\,(-1, 0)$ |
| 5 | $[\overline{D}_1, \overline{D}_2, D_3]$ | $v_{dc}\,(-1/2, -\sqrt{3}/2)$ |
| 6 | $[D_1, \overline{D}_2, D_3]$ | $v_{dc}\,(1/2, -\sqrt{3}/2)$ |
| 7 | $[D_1, D_2, D_3]$ | $v_{dc}\,(0, 0)$ |

Since states 0 and 7 define the same zero voltage, there are seven possible stator voltages that could result from the eight possible switch settings of the active switching devices of the rectifier.

Minimizing the distortion index is accomplished by finding which stator voltage vector is closest to the desired voltage vector defined by $v_{s\alpha}$ and $v_{s\beta}$. Graphically, the $\alpha,\beta$ coordinate space can be divided into seven regions: an inner circle 104 of radius $v_{dc}/2$, plus six 60° sectors 106–111 of outer radius $v_{dc}$ surrounding the inner circle, each sector having a switch state centered at the outer radius thereof.

Determining the closest voltage vector is a matter of finding into which region the desired voltage vector falls. To do so, the magnitude of the desired voltage vector is first compared to $v_{dc}/2$ to determine whether the desired voltage vector falls within the inner circle 104. If the magnitude of the desired voltage vector is less than one-half of $v_{dc}$, then state 0 or state 7 is the desired switch state. Choosing between state 0 and state 7 is accomplished by selecting the state that requires the fewest number of switches to change state from the previous switch setting.

Next, if the magnitude of the desired voltage vector exceeds $v_{dc}/2$, then the signs of $V_{s\alpha}$ and $V_{s\beta}$ are examined to determine in which quadrant the voltage vector falls. If the sign of $v_{s\alpha}$ is positive, then states 1, 2, or 6 are candidates, and, if negative, then states 3, 4, or 5 are candidates. If both $V_{s\alpha}$ and $V_{s\beta}$ are positive, for example, then either state 1 or state 2 is the closest voltage vector. For $v_{s\alpha}$ and $v_{s\beta}$ positive, state 1 is closest if $v_{s\alpha} > \sqrt{3}\,v_{s\beta}$, otherwise state 2 is closest. This is so because a dividing line 112 between sector 106 of state 1 and sector 107 of state 2 is inclined at 30° to the $\alpha$ axis, and because:

$$\tan 30° = \frac{v_{s\beta}^*}{v_{s\alpha}^*} = \frac{1}{\sqrt{3}}. \quad (27)$$

The selections between states 3 and 4, 4 and 5, and 1 and 6 in the other quadrants are developed in the same manner. Once the closest voltage vector is found, the switch state associated with that voltage vector is output to the selector 100.

Referring back to FIG. 5, operation with the current controller 96 generating the PWM commutation signals occurs at relatively low speeds, where the DC voltage link offers substantial ceiling voltage. In that situation, the current controller 96 keeps the stator currents in close agreement with the desired stator current values. This operation effectively results in current sources for the stator windings, which allows the current controller to ignore the stator voltages.

At higher speeds, however, where the generator emf approaches the voltage of the DC voltage link, the stator voltages can no longer be ignored. In this operating region, the voltage controller 98 takes the stator voltages into consideration.

The selector 100 senses the rotor speed, $\omega_r$, and selects the voltage controller 98 instead of the current controller 96 when the rotor speed exceeds a predetermined value. This value can be determined empirically by observing the distortion of the current waveform during operation of the current controller at various speeds. In the preferred embodiment, using a four pole squirrel-cage induction generator with a 1800 rpm synchronous speed and operating at a nominal voltage of 750 volts, the switching point is about 1780 rpm. Preferably, some hysteresis is built into the switching point of the selector 100 so that small oscillations of the rotor speed about the switching point do not cause repeated switching between current control and voltage control. As an alternative to or in addition to monitoring the rotor speed, the DC link voltage and the generator emf can be monitored to determine at which point to switch between current control and voltage control. Monitoring the DC link voltage is not necessary in the preferred embodiment because the inverter control unit 88 maintains that voltage at a fairly constant value.

Like the current controller 96, the voltage controller 98 periodically generates a set of PWM commutation signals for switching on and off the active switches of the rectifier. The voltage controller monitors the desired and actual torque and flux, as defined by the field oriented currents, $i_{sd}$ and $i_{sq}$, compensates for the stator voltages, and generates field oriented control voltages, $v_{sd}$ and $v_{sq}$, which are used to generate the commutation signals.

The stator voltages, in field coordinates, are defined by the following equations:

$$\frac{\sigma L_s i_{sd}}{R_s} + i_{sd} = \frac{v_{sd}}{R_s} - \frac{(1-\sigma) L_s \lambda_r}{R_s L_o} + \frac{\sigma L_s \omega_s i_{sq}}{R_s} \quad (28)$$

$$\frac{\sigma L_s i_{sq}}{R_s} + i_{sq} = \frac{v_{sq}}{R_s} - \frac{(1-\sigma) L_s \omega_s \lambda_r}{R_s L_o} - \frac{\sigma L_s \omega_s i_{sd}}{R_s} \quad (29)$$

where:
$\sigma$ = total or global leakage factor;
$L_s$ = stator inductance;
$R_s$ = stator resistance.

The last two terms on the right sides of equations (28) and (29) are coupling terms for which compensation is required to eliminate cross coupling between the direct and quadrature axes. The goal is to generate $v_{sd}$ as a function of $i_{sd}$ and $v_{sq}$ as a function of $i_{sq}$. Eliminating the cross coupling terms allows $v_{sd}$ to control rotor flux and $v_{sq}$ to control torque.

Figure 11:
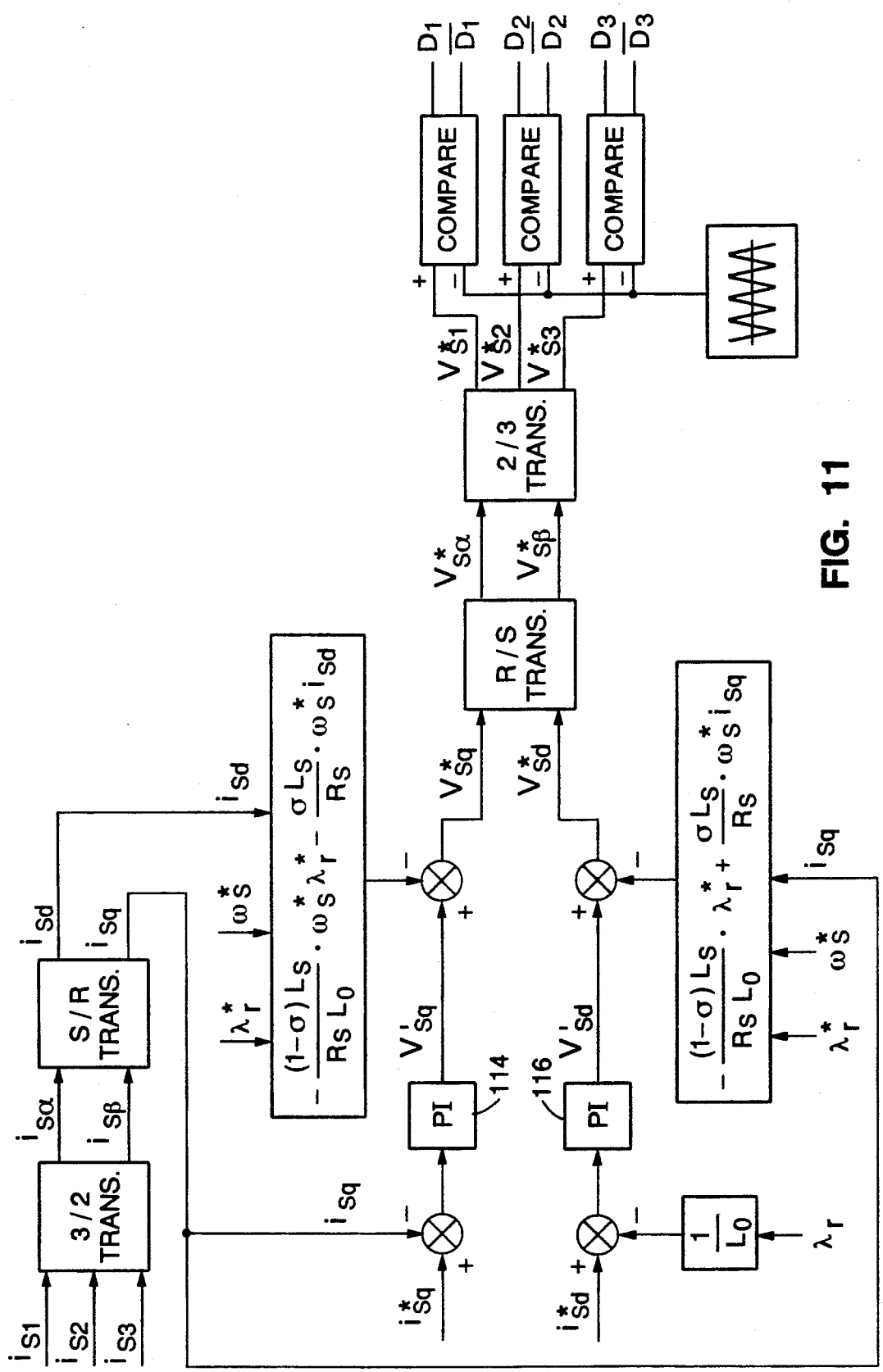
FIG. 11 is a block diagram of a voltage controller of the present invention.

The operation of the voltage controller 98 is shown in FIG. 11. The actual 3 phase stator currents, $i_{s1}$, $i_{s2}$, $i_{s3}$, are converted into field oriented coordinates by equations (1) and (2). The desired voltage on the quadrature axis, $V_{sq}$, is generated by first subtracting the actual quadrature current, $i_{sq}$, from the desired quadrature current, $i_{sq}$, and then running the resultant through a proportional-integral (PI) controller 114 to generate $V_{sq}$, which is a measure of quadrature axis current error. The PI controller supplies a proportional/integral output of the form:

$$V_{sq} = k_p (i_{sq} - i_{sq}) + k_i \int (i_{sq} - i_{sq}) \, dt \quad (30)$$

where $k_p$ and $k_i$ are coefficients selected to provide adequate stability. Equation (30) can be evaluated in discrete time by the following:

$$v_{sq}(k) = v_{sq}(k-1) + (k_p + \Delta t \, k_i)(i_{sq}(k) - i_{sq}(k)) - k_p (i_{sq}(k-1) - i_{sq}(k-1)) \quad (31)$$

The value of $v_{sq}$ is then compensated by adding a decoupling factor consisting of the two voltage coupling terms on the right side of equation (29), which results in $v_{sq}$ as follows:

$$v_{sq}^* = v_{sq}' + \frac{(1-\sigma) L_s \omega_s^* \lambda_r^*}{R_s L_o} + \frac{\sigma L_s \omega_s^* i_{sd}}{R_s} \quad (32)$$

Similarly, the desired voltage on the direct axis, $v_{sd}$, is generated by first subtracting the rotor flux divided by the mutual inductance, $\lambda_r/L_o$, from the desired direct axis current, $i_{sd}$. The resultant is then input to another PI controller 116, which generates $v_{sd}$ as a measurement of direct axis current error. PI controller 116 is similar to the PI controller 114 for the quadrature component. The value of $v_{sd}$ is then compensated by adding a decoupling factor consisting of the two voltage coupling terms on the right side of equation (28), which results in $v_{sd}$ as follows:

$$v_{sd}^* = v_{sd}' + \frac{(1-\sigma) L_s \lambda_r^*}{R_s L_o} - \frac{\sigma L_s \omega_s^* i_{sq}}{R_s} \quad (33)$$

Once the desired field coordinate voltages, $v_{sd}$ and $v_{sq}$, have been generated, they are transformed into 3-phase stator voltages by equations (3) and (4), resulting in $v_{s1}$, $v_{s2}$, and $v_{s3}$. These reference voltages are modulated by a triangular carrier wave to generate the PWM commutation signals, $D_1$, $\overline{D}_1$, $D_2$, $\overline{D}_2$, $D_3$ and $\overline{D}_3$ that are sent to the selector 100 (FIG. 5). In the preferred embodiment, the triangular carrier wave has a frequency of about 8 kHz, while the comparisons between the reference voltages and the carrier wave are performed continuously or at a rate much higher than 8 kHz.

Figure 12:
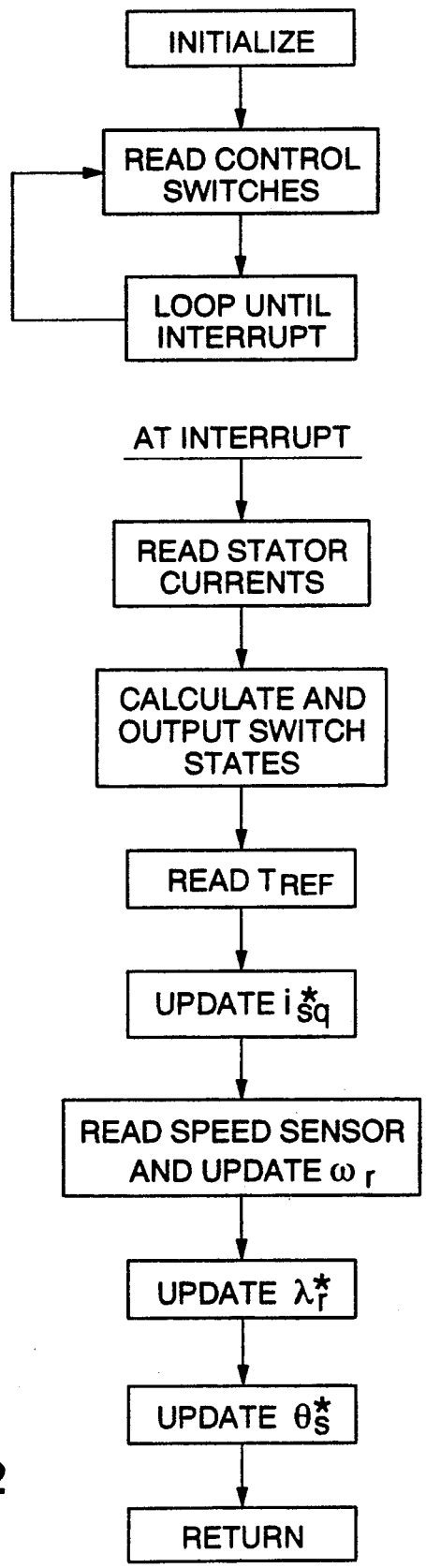
FIG. 12 is a block diagram of a computer program used in the generator control unit of the present invention.

FIG. 12 illustrates how a computer program is structured for execution in the digital signal processor of the generator control unit. The program consists primarily of a main loop and an interrupt service routine. The main loop initializes the necessary variables, and then loops until it is interrupted, which occurs periodically, at about 8 kHz in the preferred embodiment. The interrupt service routine performs the calculations necessary for generating the PWM commutation signals, and then updates the control variables. Upon interrupt, the interrupt service routine first reads the stator currents, and then executes the code of either the current controller or the voltage controller to generate and output the appropriate switch states. The interrupt routine then reads a value for the torque reference, $T_{ref}$, and updates the corresponding value of the desired quadrature axis current, $i_{sq}$. The routine then reads the speed sensor and computes a new value for the rotor speed, $\omega_r$. The routine updates the value for desired rotor flux, $\lambda_r$, and the desired instantaneous rotor flux angle, $\theta_s$. The interrupt routine then returns to the main loop, which waits until the next periodic interrupt, at which time the updated values will be used to compute the switch states. All constants used in the calculations are computed in advance, and the expressions are arranged to avoid division, which executes relatively slowly in a DSP. The steps performed in the computer program can be executed in different order than is shown in FIG. 12, but it is important to calculate and output the switch states as soon as possible after reading the actual stator currents.

Figure 13:
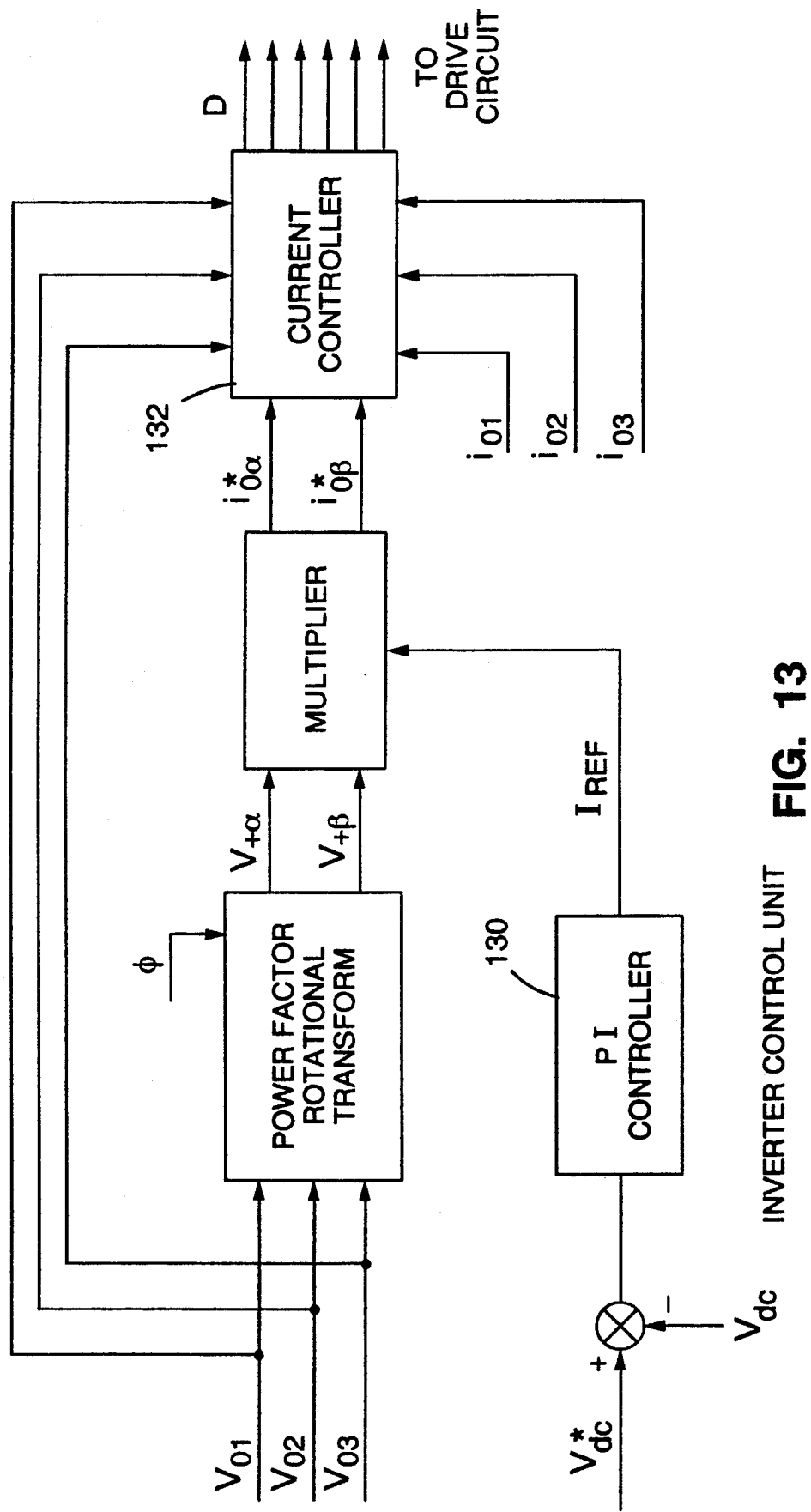
FIG. 13 is a block diagram of an inverter control unit of the present invention.
Figure 14:
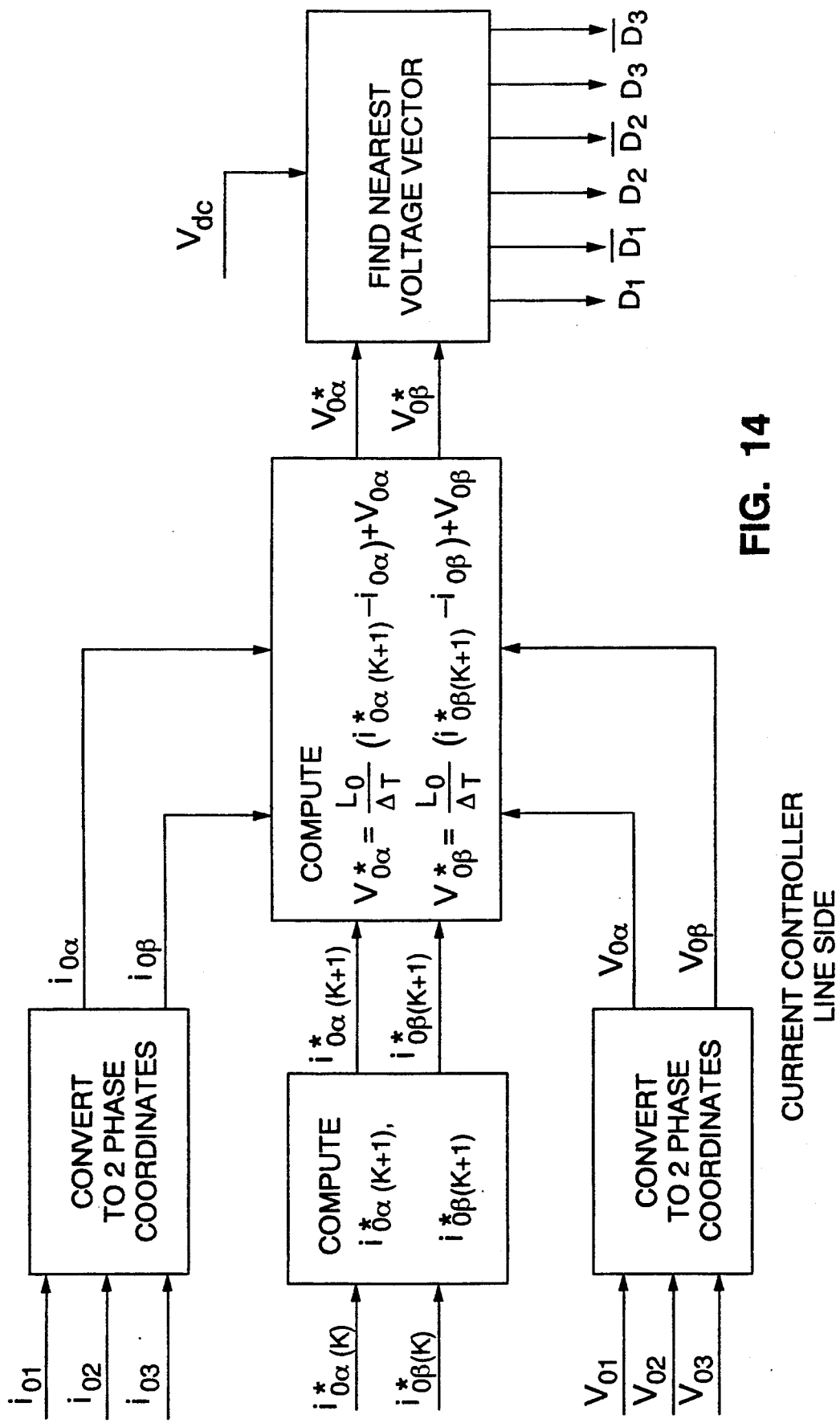
FIG. 14 is a block diagram of a current controller used in the inverter control unit of FIG. 13.
Figure 15:
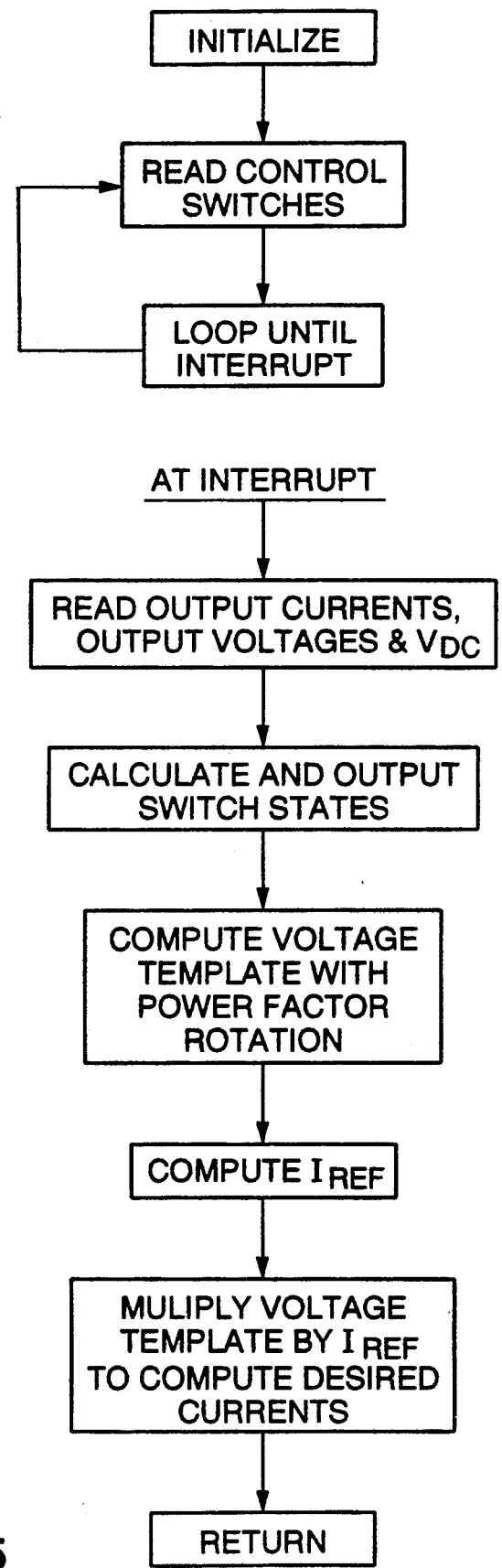
FIG. 15 is a block diagram of a computer program used in the inverter control unit of the present invention.

Turning now to the inverter side of the wind turbine system, the details of the inverter control unit 88 are shown in FIGS. 13-15. Like the generator control unit 76, the inverter control unit is preferably implemented with a digital signal processor, a Texas Instruments model TMS320C25. Computer code for implementing the inverter control function in a DSP is disclosed in the microfiche appendix.

The inverter control unit controls the inverter switch matrix to supply to the utility grid power with adjustable power factor and low THD. The inverter and its control unit can supply or absorb reactive power as needed by adjusting the phase difference between the output voltage and current. Low harmonic distortion is achieved in the same way as in the current controller of the generator control unit, by periodically minimizing a distortion index. In addition, the inverter control unit also controls the voltage of the DC voltage link, to maintain it at a desired value.

As shown in FIG. 13, the inverter control unit uses the output voltage as a sinusoidal waveform reference, rotates the reference waveform by a certain phase angle to generate a rotated reference waveform, or "template", then multiplies the template waveform by a factor, $I_{ref}$, derived from the DC link voltage, $v_{dc}$, to generate a desired current waveform. The actual currents are compared to the desired currents to generate the PWM commutation signals for the inverter switches. All of the calculations of the inverter control unit are performed periodically. In the preferred embodiment, the DSP cycles through its calculations every 125 microseconds, equal to a rate of 8 kHz.

The multiplication factor, $I_{ref}$, is calculated as follows. The measured DC link voltage, $v_{dc}$, is subtracted from a desired value of the DC link voltage, $v_{dc}$, to generate an error, which is then input to a PI controller 130. The PI controller supplies a proportional/integral output of the form:

$$I_{ref} = k_p(v_{dc} - v_{dc}) + k_i \int (v_{dc} - v_{dc}) \, dt \quad (34)$$

where $k_p$ and $k_i$ are coefficients selected to provide adequate stability. In discrete time, equation (34) can be evaluated as follows:

$$I_{ref(k)} = I_{ref(k-1)} + (k_p + \Delta t \, k_i)(v_{dc(k)} - v_{dc(k)}) - k_p (v_{dc(k-1)} - v_{dc(k-1)}) \quad (35)$$

The rotational transformation of the reference waveform can be accomplished in either 3-phase or 2-phase coordinates. In 3-phase coordinates, the template waveform, rotated by an angle $\phi$, is calculated as follows:

$$v_{t1} = (\cos \phi + \sqrt{3}/3 \sin \phi) v_{o1} + (2\sqrt{3}/3 \sin \phi) v_{o2} \quad (36)$$

$$v_{t2} = (\cos (\phi + 2\pi/3) + \sqrt{3}/3 \sin (\phi + 2\pi/3)) v_{o1} + (2\sqrt{3}/3 \sin (\phi + 2\pi/3)) v_{o2} \quad (37)$$

$$v_{t3} = -v_{t1} - v_{t2} \quad (38)$$

$$v_{t3} = -v_{t1} - v_{t2} \quad (38)$$

These values can be transformed into the 2-phase $\alpha,\beta$ coordinate system using equation (1). The result is $v_{t\alpha}$ and $v_{t\beta}$. The template values that result from the rotational transformation, $v_{t\alpha}$ and $v_{t\beta}$, are then multiplied by the value of $I_{ref}$ to generate the desired 2-phase output currents, $i_{o\alpha}$ and $i_{o\beta}$. The desired output currents are input into a current controller 132, which compares them to the actual currents and generates the appropriate PWM commutation signals for the inverter switches.

The current controller 132 of the inverter control unit can be implemented in the several ways described above for the current controller 96 of the generator control unit, including the delta modulator. Preferably, however, the current controller 132 generates switch states that minimize the distortion index, J, in a manner similar to that described above with respect to FIGS. 9 and 10. Referring to FIG. 14, the inverter current controller generates: desired output voltages, $v_{o\alpha}$ and $v_{o\beta}$, according to the following equations:

$$v_{o\alpha}^* = \frac{L_o (i_{o\alpha(k+1)}^* - i_{o\alpha})}{\Delta t} + v_{o\alpha} \quad (39)$$

$$v_{o\beta}^* = \frac{L_o (i_{o\beta(k+1)}^* - i_{o\beta})}{\Delta t} + v_{o\beta} \quad (40)$$

where:

$L_o$ is the output impedance;

$i_{o\alpha(k+1)}$ and $i_{o\beta(k+1)}$ are the desired output currents at time = k+1 in $\alpha,\beta$ coordinates;

$i_{o\alpha}$ and $i_{o\beta}$ are the measured output currents in $\alpha,\beta$ coordinates;

$v_{o\alpha}$ and $v_{o\beta}$ are the measured output voltages in $\alpha,\beta$ coordinates;

$\Delta t$ is the sample period.

The desired output voltages, $v_{o\alpha}$ and $v_{o\beta}$, are then compared to the seven available voltage vectors, and the switch state associated with the nearest voltage vector is selected and output to the inverter switches. Determining the nearest voltage vector is accomplished in the same manner as explained above with respect, to the generator current controller of FIGS. 9 and 10.

A computer program directs the operation of the digital signal processor of the inverter control unit to perform the calculations described above. As shown in FIG. 15, the computer program is structured like that of the generator control unit in that a main loop executes until periodically interrupted, and then an interrupt service routine updates the sensed inputs, PWM switch state, and calculated variables. The interrupt service routine running on the inverter control unit DSP first reads the output currents, output voltages and DC link voltage. Then it calculates the optimal switch state, which it outputs to the inverter switches. Then the interrupt routine performs calculations necessary for the next calculation of switch state by rotating the voltage reference to define the template waveform, computing the multiplication factor $I_{ref}$, and multiplying the template waveform by $I_{ref}$ to compute the desired currents for the next interrupt. Then control passes to the main loop, where it waits until interrupted again. In the preferred embodiment, interruptions occur at a rate of about 8 kHz.

Referring back to FIG. 2, the power factor controller 54 can control either the power factor angle, $\phi$, or the magnitude of reactive power to supply vars (volt-ampere-reactive) to the utility. The type of power factor control is specified by the operation mode signal that is input into the power factor controller. If the power factor angle is controlled, the power factor controller 54 outputs to the inverter control unit 88 a constant value of $\phi$ that is defined by the power factor input signal. If the reactive power is controlled, the power factor controller monitors the reactive power feedback signal, $Q_{fb}$, compares it to a desired reactive power level defined by the reactive power input signal, and adjusts the power factor angle, $\phi$, to obtain the desired reactive power.

The power factor correction facility of the inverter control unit can be utilized even when the wind turbine is not operating, by operating in a static var mode. To do so, the power factor controller 54 sets the power factor angle $\phi$ equal to 90°. After the DC link is charged up by the utility through the inverter, the inverter control unit operates as described above to rotate the output current to lead the voltage by 90°. This supplies reactive power to the utility to counteract reactive loads drawing power from the utility grid.

From the above description, it will be apparent that the invention disclosed herein provides a novel and advantageous variable speed wind turbine. The foregoing discussion discloses and describes merely exemplary methods and embodiments of the present invention. As will be understood by those familiar with the art, the invention may be embodied in other specific forms without departing from the spirit or essential characteristics thereof. For example, some aspects of the current controller can be performed in various ways equivalent to those disclosed herein, including using hysteresis control or forced oscillation with triangular intersection. The generator need not be a three-phase squirrel-cage induction generator, but may be any multiphase generator, including a synchronous generator. Certain aspects of the generator control could be performed open-loop, instead of the closed loop control disclosed herein. Also, the power converter could have a DC current link, or could be a cyclo-converter instead of a DC voltage link. In addition, the torque monitor could directly measure torque with a transducer, instead of inferring torque from the measured stator currents. Accordingly, the disclosure of the present invention is intended to be illustrative, but not limiting, of the scope of the invention, which is set forth in the following claims.

What is claimed is:

1. A variable speed wind turbine comprising:
   a turbine rotor including at least one blade mounted to a rotatable shaft;
   a multiphase generator having a stator and a rotor coupled to the turbine shaft for rotation therewith;
   a power converter including active switches operable for controlling stator electrical quantities for each phase of the generator;
   torque command means associated with turbine parameter sensors for defining a torque reference signal; and
   generator controller means coupled to the power converter for controlling the active switches including field orientation means responsive to the torque reference signal for defining a desired quadrature axis current in field coordinates, and switch control means for controlling the active switches to produce stator electrical quantities that correspond to the desired quadrature axis current.

2. A wind turbine as recited in claim 1 wherein the stator electrical quantities are stator currents, and wherein the switch control means includes means for controlling the active switches to produce stator currents that correspond to the desired quadrature axis current.

3. A wind turbine as recited in claim 2 further comprising stator current sensors operable for sensing stator currents, wherein the generator controller means further includes means for converting the desired quadrature axis current into desired stator currents, and wherein the switch control means further includes delta modulator means for comparing the desired stator currents to the sensed stator currents and for controlling the active switches to increase current in each phase if the actual stator current for that phase is less than the desired stator current for that phase and to decrease current if the actual stator current is greater than the desired stator current.

4. A wind turbine as recited in claim 2 further comprising stator current sensors operable for sensing stator currents, wherein the generator controller means further includes means for converting the desired quadrature axis current into desired stator currents, and wherein the switch control means further includes means for minimizing a distortion index indicating the magnitude of current errors between the sensed and desired stator currents.

5. A wind turbine as recited in claim 1 wherein the stator electrical quantities are stator voltages, and wherein the switch control means includes means for controlling the active switches to produce stator voltages that correspond to the desired quadrature axis current.

6. A wind turbine as recited in claim 5 further comprising stator current sensors operable for sensing stator currents, wherein the generator controller means further includes means for converting the desired quadrature axis current into desired quadrature axis voltage by compensating for cross coupling between the direct and quadrature axes, and wherein the switch control means further includes means for controlling the active switches to produce stator voltages that correspond to the desired quadrature axis voltage.

7. A wind turbine as recited in claim 1 wherein the stator electrical quantities are stator currents when the generator is operating at low rotational speeds and are stator voltages at higher rotational speeds, and wherein the switch control means includes means responsive to the rotational speed of the generator for controlling the active switches to produce stator currents that correspond to the desired quadrature axis current at the low rotational speeds and to produce stator voltages that correspond to a desired quadrature axis voltage at the higher rotational speeds.

8. A wind turbine as recited in claim 1 further comprising rotor speed sensor means for defining a rotor speed signal indicative of the rotational speed of the generator rotor, wherein the power converter establishes a flux field in the generator rotor that rotates at a slip speed with respect to the rotor, and wherein the generator controller means further includes means for defining the magnitude of the rotor flux field as a function of a desired direct axis current in field coordinates aligned with the direction of the rotor flux field and means for defining the direction of the rotor flux field as a function of the slip speed and rotor speed.

9. A wind turbine as recited in claim 8 wherein the means for defining the direction of the rotor flux vector includes means for defining the slip speed as a function of the quadrature axis current and the magnitude of the rotor flux, and includes means for adding the slip speed to the rotor speed and integrating the sum to obtain a rotor flux angle.

10. A wind turbine as recited in claim 8 further comprising means for periodically converting the desired direct and quadrature axis currents from rotating field coordinates into fixed stator coordinates to define desired stator electrical quantities, and wherein the switch control means further includes means for periodically selecting a switch state for the active switches that produces stator electrical quantities that correspond to the desired stator electrical quantities.

11. A wind turbine as recited in claim 10 wherein the means for periodically converting the desired direct and quadrature axis currents from rotating field coordinates into fixed stator coordinates includes means for determining an instantaneous rotor flux angle that defines a coordinate transformation for the conversion.

12. A wind turbine as recited in claim 1 further comprising stator current sensors operable for sensing stator currents and a torque monitor operable for determining a measure of generator torque, wherein the torque monitor includes means for converting the sensed stator currents into field coordinates and then converting into a sensed torque value.

13. A wind turbine as recited in claim 12 further comprising rotor speed sensor means for sensing the speed of the generator rotor and pitch sensor means for sensing the pitch angle of the turbine blade, and wherein the torque command means is responsive to blade pitch, rotor speed, and sensed torque for defining the torque reference signal.

14. A wind turbine as recited in claim 1 wherein the generator controller means includes a digital signal processor that periodically receives a torque reference signal indicative of desired generator torque and a rotor speed signal indicative of the rotational speed of the generator, computes the desired quadrature axis current and converts it into stator coordinates, and determines pulse width modulation signals for switching the active switches to produce stator electrical quantities that correspond to the desired quadrature axis current.

15. A wind turbine as recited in claim 1 wherein the power converter includes a rectifier, inverter, and DC voltage link coupled between the rectifier and inverter, wherein the rectifier includes a pair of active switches for each phase of the generator coupled between the DC voltage link and a stator winding of the generator and operable for switching stator electrical quantities therebetween to establish a rotating flux field in the generator rotor.

16. A wind turbine as recited in claim 1 wherein the switch control means includes means for defining pulse-width modulation commutation signals for switching the active switches of the power converter.

17. A variable speed wind turbine comprising:
a turbine rotor including at least one blade mounted to a rotatable shaft;
a multiphase induction generator having a rotor coupled to the turbine shaft for rotation therewith, wherein the generator includes a stator power tap for each phase;
a power converter including a rectifier, inverter, and DC voltage link coupled between the rectifier and inverter, wherein the rectifier includes a pair of active switches for each phase of the generator coupled between the DC voltage link and a stator power tap and operable for switching stator currents therebetween to establish a rotating flux field in the generator rotor, and wherein the inverter includes a pair of active switches for each phase of output power coupled between the DC voltage link and an output tap and operable for switching inverter currents therebetween;
generator controller means coupled to the rectifier and responsive to a torque reference signal and a rotor speed signal for controlling the rectifier switches to regulate stator electrical quantities, wherein the generator controller means includes field orientation means for defining the magnitude of the rotor flux field as a function of a desired direct axis current in rotating field coordinates aligned with the direction of the rotor flux field and for converting the torque reference and rotor speed signals into a desired quadrature axis current in field coordinates oriented normal to a rotor flux vector, and further includes modulation means for controlling the rectifier switches to produce stator electrical quantities that correspond to the desired quadrature and direct axis currents;
inverter controller means coupled to the inverter for controlling the inverter switches to regulate the inverter currents;
rotor speed sensor means for monitoring the speed of the generator rotor and for defining the rotor speed signal in accordance therewith; and
torque command means for defining a torque reference signal and supplying it to the generator controller.

18. A wind turbine as recited in claim 17 wherein the rotor flux field rotates at a slip speed with respect to the rotor, and wherein the generator controller means further includes means for defining the direction of the rotor flux field as a function of the slip speed and rotor speed.

19. A wind turbine as recited in claim 18 wherein the means for defining the direction of the rotor flux vector includes means for defining the slip speed as a function of the quadrature axis current and the magnitude of the rotor flux, and includes means for adding the slip speed to the rotor speed and integrating the sum modulo $2\pi$ to obtain a rotor flux angle.

20. A wind turbine as recited in claim 18 further comprising means for periodically converting the desired direct and quadrature axis currents from field coordinates into stator coordinates to define desired stator electrical quantities, and wherein the modulation means further includes means for periodically selecting a switch state for the rectifier switches that produces stator electrical quantities that correspond to the desired stator electrical quantities.

21. A wind turbine as recited in claim 20 wherein the means for periodically converting the desired direct and quadrature axis currents from field coordinates into stator coordinates includes means for determining an instantaneous rotor flux angle that defines a coordinate transformation for the conversion.

22. A wind turbine as recited in claim 17 further comprising stator current sensors coupled to the power converter and operable for sensing stator currents, a blade pitch sensor coupled to the turbine blade for sensing the pitch angle of the turbine blade, and a torque monitor coupled to the stator current sensors and operable for defining a measure of generator torque, wherein the torque monitor includes means for converting the sensed stator currents into field coordinates and then converting into a torque feedback signal.

23. A wind turbine as recited in claim 22 wherein the torque command means includes means responsive to the pitch angle, generator torque, and rotor speed for defining the torque reference signal.

24. A wind turbine as recited in claim 17 wherein the generator controller means includes a digital signal processor that periodically receives the torque reference signal and the rotor speed signal, computes the desired quadrature axis current and rotor flux angle and converts the desired quadrature and direct axis currents into stator coordinates, and determines pulse width modulation signals for switching the rectifier switches to produce stator electrical quantities that correspond to the desired quadrature and direct axis currents.

25. A variable speed wind turbine comprising:
a turbine rotor including at least one blade mounted to a rotatable shaft;

a multiphase induction generator having a rotor coupled to the turbine shaft for rotation therewith;

a power converter including active switches operable for controlling stator electrical quantities for each phase of the generator to establish a rotating flux field in the generator rotor;

stator current sensors operable for sensing stator currents;

torque monitor means responsive to sensed stator currents for determining a measure of generator torque;

pitch sensing means for sensing the pitch of the turbine blade;

rotor speed sensor means for sensing the speed of the generator rotor;

torque command means responsive to the generator torque, blade pitch, and rotor speed for defining a torque reference signal; and generator controller means coupled to the active switches for controlling stator electrical quantities, wherein the generator controller means includes processor means responsive to the torque reference signal and the rotor speed for defining a flux-producing desired direct axis current in rotating field coordinates aligned with the direction of the rotor flux field and a torque-producing desired quadrature axis current in field coordinates oriented normal to the rotor flux field, the processor means including means for periodically determining a desired rotor flux angle as a function of the rotor speed and desired quadrature and direct axis currents, the processor means including means for converting the desired direct and quadrature axis currents from field coordinates into stator coordinates using the desired rotor flux angle to define desired stator electrical quantities, and includes modulation means for controlling the active switches to produce stator electrical quantities that correspond to the desired stator electrical quantities.

26. A method for controlling torque in a wind turbine having a generator coupled to a power converter with active switches, wherein the active switches establish a rotating flux field in the generator rotor, the method comprising of the steps of:

defining a torque reference signal indicative of a desired generator torque;

converting the torque reference signal into a desired quadrature axis current representing torque in rotating field coordinates normal to the rotor flux field; and controlling the active switches of the power converter to produce stator electrical quantities that correspond to the desired quadrature axis current.

27. A method for controlling torque in a wind turbine as recited in claim 26 further comprising the steps of:

determining a desired direct axis current representing rotor flux in a direction aligned with the rotor flux field in field coordinates;

sensing the rotational speed of the generator rotor;

defining a rotor flux angle indicative of the instantaneous position of the rotor flux field; and converting the desired quadrature and direct axis currents into desired stator electrical quantities in a stationary stator coordinate system using the rotor flux angle;

and wherein the step of controlling the active switches includes the step of producing stator electrical quantities that correspond to the desired stator electrical quantities.

28. A method for controlling torque in a wind turbine as recited in claim 26 wherein the step of defining a torque reference signal includes the steps of sensing the stator currents, converting the sensed stator currents into a quadrature axis current normal to the rotor flux field to define a torque feedback signal indicative of rotor torque, and using the torque feedback signal to define the torque reference signal.

29. A method for controlling torque in a wind turbine as recited in claim 26 further comprising the steps of defining a rotor flux angle by defining a slip speed of the rotor flux as a function of the desired quadrature axis current and the rotor flux magnitude, sensing rotor speed and adding the rotor speed to the slip speed to define a rotor flux speed, and integrating the rotor flux speed to obtain the rotor flux angle.

30. A method for controlling torque in a wind turbine as recited in claim 26 further comprising the steps of defining a rotor flux angle indicative of the relative rotation between the field coordinates and stationary coordinates, and transforming the desired quadrature axis current into a stationary frame of reference using the rotor flux angle.

31. A method for controlling torque in a wind turbine as recited in claim 26 wherein the stator electrical quantities are stator currents, and wherein the step of controlling the active switches includes the step of producing stator currents that correspond to the desired stator currents.

32. A method for controlling torque in a wind turbine as recited in claim 31 wherein the step of controlling the active switches includes the steps of sensing the stator currents and minimizing a distortion index indicating the magnitude of current errors between the sensed and desired stator currents.

33. A method for controlling torque in a wind turbine as recited in claim 26 wherein the stator electrical quantities are stator voltages, wherein the method further comprises the step of converting the desired quadrature axis current into a desired quadrature axis voltage, and wherein the step of controlling the active switches includes the step of producing stator voltages that corresponds to the desired quadrature axis voltage.

34. A method for controlling torque in a wind turbine as recited in claim 26 wherein the stator electrical quantities are stator currents when the generator is operating at low rotational speeds and are stator voltages at higher rotational speeds, and wherein the step of controlling the active switches includes the step of producing stator currents that correspond to the desired quadrature axis current at the low rotational speeds and producing stator voltages that correspond to the desired quadrature axis current at the higher rotational speeds.

35. A method for controlling torque in a wind turbine having an induction generator coupled to an active rectifier, wherein the active rectifier establishes a rotating flux field in the generator rotor, the method comprising of the steps of:

defining a torque reference signal indicative of a desired generator torque;

determining a desired direct axis current representing rotor flux in a direction aligned with the rotor flux field in a rotating field coordinate system;

converting the torque reference signal into a desired quadrature axis current representing rotor torque, wherein the quadrature axis current is normal to the rotor flux field in the field coordinate system;

sensing the rotational speed of the generator rotor;

defining a rotor flux angle indicative of the instantaneous position of the rotor flux field;

converting the desired quadrature and direct axis currents into desired stator electrical quantities in a stationary stator coordinate system using the rotor flux angle; and supplying pulse width modulation signals to switches of the active rectifier to produce stator electrical quantities that correspond to the desired stator electrical quantities.

36. A method for controlling torque in a wind turbine as recited in claim 35 wherein the steps of defining a rotor flux angle, converting the desired quadrature and direct axis currents, and supplying pulse width modulation signals are performed periodically.

37. A method for controlling torque in a wind turbine as recited in claim 35 wherein the step of defining a torque reference signal includes the steps of sensing the stator currents, converting the sensed stator currents into a quadrature axis current normal to the rotor flux field, converting the quadrature axis current into a torque feedback signal indicative of torque, and using the torque feedback signal to define the torque reference signal.

38. A method for controlling torque in a wind turbine as recited in claim 35 wherein the step of defining a rotor flux angle includes the steps of defining a slip speed of the rotor flux as a function of the desired quadrature axis current and the rotor flux magnitude, adding the rotor speed to the slip speed to define a rotor flux speed, and integrating the rotor flux speed modulo $2\pi$ to obtain the rotor flux angle.

39. A method for controlling torque in a wind turbine as recited in claim 35 wherein the step of converting the desired quadrature and direct axis currents into desired stator electrical quantities includes the step of transforming the desired quadrature and direct axis current into a stationary frame of reference using the rotor flux angle, where the rotor flux angle defines the relative angle between the field coordinates and stationary coordinates.

40. A method for controlling torque in a wind turbine having an induction generator coupled to an active rectifier, wherein the active rectifier establishes a rotating flux field in the generator rotor, the method comprising of the steps of:

sensing stator currents;

determining a measure of generator torque by converting the sensed stator currents into a quadrature axis current normal to the rotor flux field;

sensing the pitch angle of the turbine blade;

sensing the rotational speed of the generator rotor;

defining a torque reference signal indicative of a desired generator torque in response to the sensed generator torque, pitch angle, and rotational speed;

determining a desired direct axis current representing rotor flux in a direction aligned with the rotor flux field in a rotating field coordinate system;

converting the torque reference signal into a desired quadrature axis current representing rotor torque, wherein the quadrature axis current is normal to the rotor flux field in the field coordinate system;

periodically defining a rotor flux angle indicative of the desired instantaneous position of the rotor flux field as a function of the rotor speed and the desired quadrature and direct axis currents;

periodically converting the desired quadrature and direct axis currents into desired stator electrical quantities using the rotor flux angle; and periodically supplying pulse width modulation signals to the active rectifier to produce stator electrical quantities that correspond to the desired stator electrical quantities.

41. A variable speed wind turbine comprising:

a turbine rotor including at least one blade mounted to a rotatable shaft;

a multiphase generator having a stator and a rotor coupled to the turbine shaft for rotation therewith;

a power converter including active switches operable for controlling stator currents for each phase of the generator;

torque command means associated with turbine parameter sensors for defining a torque reference signal; and generator controller means coupled to the power converter for controlling the active switches including field orientation means responsive to the torque reference signal for defining a desired quadrature axis current in field coordinates, and switch control means for controlling the active switches to produce stator currents that correspond to the desired quadrature axis current.

42. A wind turbine as recited in claim 41 further comprising stator current sensors operable for sensing stator currents, wherein the generator controller means further includes means for converting the desired quadrature axis current into desired stator currents, and wherein the switch control means further includes means for minimizing a distortion index indicating the magnitude of current errors between the sensed and desired stator currents.

43. A wind turbine as recited in claim 41 further comprising means for periodically converting the desired direct and quadrature axis currents from rotating field coordinates into fixed stator coordinates to define desired stator currents, and wherein the switch control means further includes means for periodically selecting a switch state for the active switches that produces stator currents that correspond to the desired stator currents.

44. A wind turbine as recited in claim 41 wherein the generator controller means includes a digital signal processor that periodically receives a torque reference signal indicative of desired generator torque and a rotor speed signal indicative of the rotational speed of the generator, computes the desired quadrature axis current and converts it into stator coordinates, and determines pulse width modulation signals for switching the active switches to produce stator currents that correspond to the desired quadrature axis current.

45. A variable speed wind turbine comprising:

a turbine rotor including at least one blade mounted to a rotatable shaft;

a multiphase induction generator having a rotor coupled to the turbine shaft for rotation therewith, wherein the generator includes a stator power tap for each phase;

a power converter including a rectifier, inverter, and DC voltage link coupled between the rectifier and inverter, wherein the rectifier includes a pair of active switches for each phase of the generator coupled between the DC voltage link and a stator power tap and operable for switching stator currents therebetween to establish a rotating flux field in the generator rotor, and wherein the inverter includes a pair of active switches for each phase of output power coupled between the DC voltage link and an output tap and operable for switching inverter currents therebetween;

generator controller means coupled to the rectifier and responsive to a torque reference signal and a rotor speed signal for controlling the rectifier switches to regulate stator currents, wherein the generator controller means includes field orientation means for defining the magnitude of the rotor flux field as a function of a desired direct axis current in rotating field coordinates aligned with the direction of the rotor flux field and for converting the torque reference and rotor speed signals into a desired quadrature axis current in field coordinates oriented normal to a rotor flux vector, and further includes modulation means for controlling the rectifier switches to produce stator currents that correspond to the desired quadrature and direct axis currents;

inverter controller means coupled to the inverter for controlling the inverter switches to regulate the inverter currents;

rotor speed sensor means for monitoring the speed of the generator rotor and for defining the rotor speed signal in accordance therewith; and torque command means for defining a torque reference signal and supplying it to the generator controller.

46. A wind turbine as recited in claim 45 further comprising stator current sensors operable for sensing stator currents, wherein the generator controller means further includes means for converting the desired quadrature and direct axis currents into desired stator currents, and wherein the modulation means further includes delta modulator means for comparing the desired stator currents to the sensed stator currents and for controlling the rectifier switches to increase current in each phase if the actual stator current for that phase is less than the desired stator current for that phase and to decrease current if the actual stator current is greater than the desired stator current.

47. A wind turbine as recited in claim 45 further comprising stator current sensors operable for sensing stator currents, wherein the generator controller means further includes means for converting the desired quadrature and direct axis currents into desired stator currents, and wherein the modulation means further includes means for minimizing a distortion index indicating the magnitude of current errors between the sensed and desired stator currents.

48. A wind turbine as recited in claim 47 wherein the modulation means further includes means for periodically computing a distortion index for each combination of switch states and for periodically selecting the switch state that minimizes the distortion index.

49. A wind turbine as recited in claim 47 wherein the modulation means further includes means for converting the desired stator currents into desired stator voltages, means for comparing the desired stator voltages to the voltages that would result from each combination of switch states of the rectifier switches, and means for choosing the switch state having associated voltages that are nearest to the desired stator voltages.

50. A wind turbine as recited in claim 45 further comprising means for periodically converting the desired direct and quadrature axis currents from field coordinates into stator coordinates to define desired stator currents, and wherein the modulation means further includes means for periodically selecting a switch state for the rectifier switches that produces stator currents that correspond to the desired stator currents.

51. A wind turbine as recited in claim 45 wherein the generator controller means includes a digital signal processor that periodically receives the torque reference signal and the rotor speed signal, computes the desired quadrature axis current and rotor flux angle and converts the desired quadrature and direct axis currents into stator coordinates, and determines pulse width modulation signals for switching the rectifier switches to produce stator currents that correspond to the desired quadrature and direct axis currents.

52. A variable speed wind turbine comprising:
a turbine rotor including at least one blade mounted to a rotatable shaft;
a multiphase induction generator having a rotor coupled to the turbine shaft for rotation therewith;
a power converter including active switches operable for controlling stator currents for each phase of the generator to establish a rotating flux field in the generator rotor;
stator current sensors operable for sensing stator currents;
torque monitor means responsive to sensed stator currents for determining a measure of generator torque;
pitch sensing means for sensing the pitch of the turbine blade;
rotor speed sensor means for sensing the speed of the generator rotor;
torque command means responsive to the generator torque, blade pitch, and rotor speed for defining a torque reference signal; and
generator controller means coupled to the active switches for controlling stator currents, wherein the generator controller means includes processor means responsive to the torque reference signal and the rotor speed for defining a flux-producing desired direct axis current in rotating field coordinates aligned with the direction of the rotor flux field and a torque-producing desired quadrature axis current in field coordinates oriented normal to the rotor flux field, the processor means including means for periodically determining an instantaneous rotor flux angle and converting the desired direct and quadrature axis currents from field coordinates into stator coordinates to define desired stator currents, and includes modulation means for controlling the active switches to produce stator currents or voltages that correspond to the desired stator currents.

53. A method for controlling torque in a wind turbine having a generator coupled to a power converter with active switches, wherein the active switches establish a rotating flux field in the generator rotor, the method comprising of the steps of:
defining a torque reference signal indicative of a desired generator torque;
converting the torque reference signal into a desired quadrature axis current representing torque in rotating field coordinates normal to the rotor flux field; and controlling the active switches of the power converter to produce stator currents that correspond to the desired quadrature axis current.

54. A method for controlling torque in a wind turbine as recited in claim 53 further comprising the steps of:
determining a desired direct axis current representing rotor flux in a direction aligned with the rotor flux field in field coordinates;
sensing the rotational speed of the generator rotor;
defining a rotor flux angle indicative of the instantaneous position of the rotor flux field; and
converting the desired quadrature and direct axis currents into desired stator currents in a stationary stator coordinate system using the rotor flux angle and wherein the step of controlling the active switches includes the step of producing stator currents that correspond to the desired stator currents.

55. A method for controlling torque in a wind turbine as recited in claim 53 wherein the step of controlling the active switches includes the steps of sensing the stator currents and minimizing a distortion index indicating the magnitude of current errors between the sensed and desired stator currents.

56. A method for controlling torque in a wind turbine having an induction generator coupled to an active rectifier, wherein the active rectifier establishes a rotating flux field in the generator rotor, the method comprising of the steps of:
defining a torque reference signal indicative of a desired generator torque;
determining a desired direct axis current representing rotor flux in a direction aligned with the rotor flux field in a rotating field coordinate system;
converting the torque reference signal into a desired quadrature axis current representing rotor torque, wherein the quadrature axis current is normal to the rotor flux field in the field coordinate system;
sensing the rotational speed of the generator rotor;
defining a rotor flux angle indicative of the instantaneous position of the rotor flux field;
converting the desired quadrature and direct axis currents into desired stator currents in a stationary stator coordinate system using the rotor flux angle; and
supplying pulse width modulation signals to the switches of the active rectifier to produce stator currents that correspond to the desired stator currents.

57. A method for controlling torque in a wind turbine as recited in claim 56 wherein the step of converting the desired quadrature and direct axis currents into desired stator currents includes the step of transforming the desired quadrature and direct axis current into a stationary frame of reference using the rotor flux angle, where the rotor flux angle defines the relative angle between the field coordinates and stationary coordinates.

58. A method for controlling torque in a wind turbine as recited in claim 56 wherein the step of supplying pulse width modulation signals to the active rectifier includes the steps of sensing the actual stator currents, comparing the desired stator currents to the actual stator currents, and for each winding, defining a modulation signal to increase the current in that winding if the actual stator current is less than the desired stator current, otherwise defining a modulation signal to decrease the current in that winding.

59. A method for controlling torque in a wind turbine as recited in claim 56 wherein the step of supplying pulse width modulation signals to the active rectifier includes the steps of sensing the actual stator currents and minimizing a distortion index indicating the magnitude of current errors between the actual and desired stator currents.

60. A method for controlling torque in a wind turbine as recited in claim 59 wherein the step of minimizing a distortion index includes the steps of computing the distortion index for each combination of switch states of the rectifier switches, and selecting the switch state that minimizes the distortion index.

61. A method for controlling torque in a wind turbine as recited in claim 59 wherein the step of minimizing a distortion index includes the steps of converting the desired stator currents into desired stator voltages, comparing the desired stator voltages to the voltages that would result from each combination of switch states of the rectifier switches, and choosing the switch state having associated voltages that are nearest to the desired stator voltages.

62. A method for controlling torque in a wind turbine having an induction generator coupled to an active rectifier, wherein the active rectifier establishes a rotating flux field in the generator rotor, the method comprising of the steps of:
sensing stator currents;
determining a measure of generator torque by converting the sensed stator currents into a quadrature axis current normal to the rotor flux field;
sensing the pitch angle of the turbine blade;
sensing the rotational speed of the generator rotor;
defining a torque reference signal indicative of a desired generator torque in response to the sensed generator torque, pitch angle, and rotational speed;
determining a desired direct axis current representing rotor flux in a direction aligned with the rotor flux field in a rotating field coordinate system;
converting the torque reference signal into a desired quadrature axis current representing rotor torque, wherein the quadrature axis current is normal to the rotor flux field in the field coordinate system;
periodically defining a rotor flux angle indicative of the instantaneous position of the rotor flux field;
periodically converting the desired quadrature and direct axis currents into desired stator currents; and
periodically supplying pulse width modulation signals to the active rectifier to produce stator currents that correspond to the desired stator currents.

63. A variable speed wind turbine comprising:
a turbine rotor including at least one blade mounted to a rotatable shaft;
a multiphase generator having a stator and a rotor coupled to the turbine shaft for rotation therewith;
a power converter including active switches operable for controlling stator voltage for each phase of the generator;
torque command means associated with turbine parameter sensors for defining a torque reference signal; and
generator controller means coupled to the power converter for controlling the active switches including field orientation means responsive to the torque reference signal for defining a desired quadrature axis current in field coordinates, and switch control means for controlling the active switches to produce stator voltages that correspond to the desired quadrature axis current.

64. A wind turbine as recited in claim 63 further comprising stator current sensors operable for sensing stator currents, wherein the generator controller means further includes means for converting the desired quadrature axis current into desired quadrature axis voltage by compensating for cross coupling between the direct and quadrature axes.

65. A wind turbine as recited in claim 63 further comprising means for periodically converting the desired direct and quadrature axis currents from rotating field coordinates into fixed stator coordinates to define desired stator voltages, and wherein the switch control means further includes means for periodically selecting a switch state for the active switches that produces stator voltages that correspond to the desired stator voltages.

66. A wind turbine as recited in claim 63 wherein the generator controller means includes a digital signal processor that periodically receives a torque reference signal indicative of desired generator torque and a rotor speed signal indicative of the rotational speed of the generator, computes the desired quadrature axis current and converts it into stator coordinates, and determines pulse width modulation signals for switching the active switches to produce stator voltages that correspond to the desired quadrature axis current.

67. A variable speed wind turbine comprising:
a turbine rotor including at least one blade mounted to a rotatable shaft;
a multiphase induction generator having a rotor coupled to the turbine shaft for rotation therewith, wherein the generator includes a stator power tap for each phase;
a power converter including a rectifier, inverter, and DC voltage link coupled between the rectifier and inverter, wherein the rectifier includes a pair of active switches for each phase of the generator coupled between the DC voltage link and a stator power tap and operable for switching stator currents therebetween to establish a rotating flux field in the generator rotor, and wherein the inverter includes a pair of active switches for each phase of output power coupled between the DC voltage link and an output tap and operable for switching inverter currents therebetween;
generator controller means coupled to the rectifier and responsive to a torque reference signal and a rotor speed signal for controlling the rectifier switches to regulate stator voltages, wherein the generator controller means includes field orientation means for defining the magnitude of the rotor flux field as a function of a desired direct axis current in rotating field coordinates aligned with the direction of the rotor flux field and for converting the torque reference and rotor speed signals into a desired quadrature axis current in field coordinates oriented normal to a rotor flux vector, and further includes modulation means for controlling the rectifier switches to produce stator voltages that correspond to the desired quadrature and direct axis currents;
inverter controller means coupled to the inverter for controlling the inverter switches to regulate the inverter currents;
rotor speed sensor means for monitoring the speed of the generator rotor and for defining the rotor speed signal in accordance therewith; and
torque command means for defining a torque reference signal and supplying it to the generator controller.

68. A wind turbine as recited in claim 67 further comprising stator current sensors operable for sensing stator currents, wherein the generator controller means further includes means for converting the desired quadrature and direct axis currents into desired quadrature and direct axis voltages by compensating for cross coupling between the direct and quadrature axes.

69. A wind turbine as recited in claim 67 further comprising means for periodically converting the desired direct and quadrature axis currents from field coordinates into stator coordinates to define desired stator voltages, and wherein the modulation means further includes means for periodically selecting a switch state for the rectifier switches that produces stator voltages that correspond to the desired stator voltages.

70. A wind turbine as recited in claim 69 wherein the modulation means includes means for selecting the switch states by modulating the desired stator voltages with a triangular carrier wave.

71. A variable speed wind turbine comprising:
a turbine rotor including at least one blade mounted to a rotatable shaft;
a multiphase induction generator having a rotor coupled to the turbine shaft for rotation therewith;
a power converter including active switches operable for controlling stator voltages for each phase of the generator to establish a rotating flux field in the generator rotor;
stator current sensors operable for sensing stator currents;
torque monitor mean responsive to sensed stator currents for determining a measure of generator torque;
pitch sensing means for sensing the pitch of the turbine blade;
rotor speed sensor means for sensing the speed of the generator rotor;
torque command means responsive to the generator torque, blade pitch, and rotor speed for defining a torque reference signal; and
generator controller means coupled to the active switches for controlling stator voltages, wherein the generator controller means includes processor means responsive to the torque reference signal and the rotor speed for defining a flux-producing desired direct axis current in rotating field coordinates aligned with the direction of the rotor flux field and a torque-producing desired quadrature axis current in field coordinates oriented normal to the rotor flux field, the processor means including means for periodically determining an instantaneous rotor flux angle and converting the desired direct and quadrature axis currents from field coordinates into stator coordinates to define desired stator voltages, and includes modulation means for controlling the active switches to produce stator voltages that correspond to the desired stator voltages.

72. A method for controlling torque in a wind turbine having a generator coupled to a power converter with active switches, wherein the active switches establish a rotating flux field in the generator rotor, the method comprising of the steps of:

defining a torque reference signal indicative of a desired generator torque;

converting the torque reference signal into a desired quadrature axis current representing torque in rotating field coordinates normal to the rotor flux field; and controlling the active switches of the power converter to produce stator voltages that correspond to the desired quadrature axis current.

73. A method for controlling torque in a wind turbine as recited in claim 72 further comprising the steps of:

determining a desired direct axis current representing rotor flux in a direction aligned with the rotor flux field in field coordinates;

sensing the rotational speed of the generator rotor;

defining a rotor flux angle indicative of the instantaneous position of the rotor flux field; and converting the desired quadrature and direct axis currents into desired stator voltages in a stationary stator coordinate system using the rotor flux angle; and wherein the step of controlling the active switches includes the step of producing stator voltages that correspond to the desired stator voltages.

74. A method for controlling torque in a wind turbine having an induction generator coupled to an active rectifier, wherein the active rectifier establishes a rotating flux field in the generator rotor, the method comprising of the steps of:

defining a torque reference signal indicative of a desired generator torque;

determining a desired direct axis current representing rotor flux in a direction aligned with the rotor flux field in a rotating field coordinate system;

converting the torque reference signal into a desired quadrature axis current representing rotor torque, wherein the quadrature axis current is normal to the rotor flux field in the field coordinate system;

sensing the rotational speed of the generator rotor;

defining a rotor flux angle indicative of the instantaneous position of the rotor flux field;

converting the desired quadrature and direct axis currents into desired stator voltages in a stationary stator coordinate system using the rotor flux angle; and supplying pulse width modulation signals to the switches of the active rectifier to produce stator voltages that correspond to the desired stator voltages.

75. A method for controlling torque in a wind turbine as recited in claim 74 wherein the step of converting the desired quadrature and direct axis currents into desired stator voltages includes the step of transforming the desired quadrature and direct axis current into a stationary frame of reference using the rotor flux angle, where the rotor flux angle defines the relative angle between the field coordinates and stationary coordinates.

76. A method for controlling torque in a wind turbine as recited in claim 74 wherein the step of supplying pulse width modulation signals to the active rectifier includes the steps of sensing the actual stator currents, converting the actual stator currents into actual direct and quadrature axis currents in field coordinates, forming direct and quadrature axis current errors by subtracting the actual direct and quadrature axis currents from the respective desired direct and quadrature axis currents, compensating the direct and quadrature axis current errors to account for cross coupling between the direct and quadrature axes to obtain desired direct and quadrature axis voltages, transforming the desired direct and quadrature axis voltages into desired stator voltages, and supplying pulse width modulation signals to the switches of the active rectifier to produce stator voltages that follow the desired stator voltages.

77. A method for controlling torque in a wind turbine having an induction generator coupled to an active rectifier, wherein the active rectifier establishes a rotating flux field in the generator rotor, the method comprising of the steps of:

sensing stator currents;

sensing the generator torque by converting the sensed stator currents into a quadrature axis current normal to the rotor flux field;

sensing the pitch angle of the turbine blade;

sensing the rotational speed of the generator rotor;

defining a torque reference signal indicative of a desired generator torque in response to the sensed generator torque, pitch angle, and rotational speed;

determining a desired direct axis current representing rotor flux in a direction aligned with the rotor flux field in a rotating field coordinate system;

converting the torque reference signal into a desired quadrature axis current representing rotor torque, wherein the quadrature axis current is normal to the rotor flux field in the field coordinate system;

instantaneous position of the rotor flux field;

periodically converting the desired quadrature and direct axis currents into desired stator voltages; and periodically supplying pulse width modulation signals to the active rectifier to produce stator currents that correspond to the desired stator voltages.

78. A variable speed wind turbine comprising:

a turbine rotor including at least one blade mounted to a rotatable shaft;

a multiphase generator having a stator and a rotor coupled to the turbine shaft for rotation therewith;

a power converter including active switches operable for controlling stator currents for each phase of the generator;

torque command means associated with turbine parameter sensors for defining a torque reference signal; and generator controller means coupled to the power converter for controlling the active switches to regulate stator currents, wherein the generator controller includes means for regulating the generator torque by controlling the stator currents at a low speed of rotation of the generator and by controlling the stator voltages at a higher speed of rotation of the generator.

79. A wind turbine as recited in claim 78 further comprising means for defining desired stator currents when the generator is operating at the low speed of rotation and means for sensing stator currents.

80. A wind turbine as recited in claim 79 wherein the generator controller means further includes delta modulator means for comparing the desired stator currents to the sensed stator currents and for controlling the active switches to increase current in each phase if the actual stator current for that phase is less than the desired stator current for that phase and to decrease current if the actual stator current is greater than the desired stator current.

81. A wind turbine as recited in claim 79 wherein the generator controller means further includes means for minimizing a distortion index indicating the magnitude of current errors between the sensed and desired stator currents.

82. A wind turbine as recited in claim 78 further comprising means for defining desired stator voltages when the generator is operating at the higher speed of rotation, and wherein the generator controller means includes means for controlling the active switches by modulating the desired stator voltages with a triangular carrier wave.

83. A wind turbine as recited in claim 78 further comprising means for sensing the rotational speed of the generator rotor and for switching between regulating currents and regulating voltages according to the sensed rotor speed.

84. A variable speed wind turbine comprising:
a turbine rotor including at least one blade mounted to a rotatable shaft;
a multiphase induction generator having a rotor coupled to the turbine shaft for rotation therewith, wherein the generator includes a stator power tap for each phase;
rotor sensor means for sensing the rotational speed of the generator rotor;
a power converter including active switches operable for controlling stator currents for each phase of the generator and for establishing a rotating flux field in the generator rotor;
torque command means associated with turbine parameter sensors for defining a torque reference signal; and
generator controller means coupled to the power converter for controlling the magnitude and frequency of stator electrical quantities, wherein the generator controller includes means responsive to the rotor speed for regulating the generator torque by controlling the stator currents at a low speed of rotation of the generator and by controlling the stator voltages at a higher speed of rotation of the generator, the generator controller means further includes field orientation means for defining the magnitude of the rotor flux field as a function of a desired direct axis current in rotating field coordinates aligned with the direction of the rotor flux field and for converting the torque reference signal and rotor speed into a desired quadrature axis current in field coordinates oriented normal to a rotor flux vector, and further includes modulation means for controlling the active switches to produce stator electrical quantities that correspond to the desired quadrature and direct axis currents.

85. A wind turbine as recited in claim 84 further comprising means for defining desired stator currents when the generator is operating at the low speed of rotation and means for sensing stator currents.

86. A wind turbine as recited in claim 85 wherein the generator controller means further includes delta modulator means for comparing the desired stator currents to the sensed stator currents and for controlling the active switches to increase current in each phase if the actual stator current for that phase is less than the desired stator current for that phase and to decrease current if the actual stator current is greater than the desired stator current.

87. A wind turbine as recited in claim 85 wherein the generator controller means further includes means for minimizing a distortion index indicating the magnitude of current errors between the sensed and desired stator currents.

88. A wind turbine as recited in claim 84 further comprising means for defining desired stator voltages when the generator is operating at the higher speed of rotation, and wherein the generator controller means includes means for controlling the active switches by modulating the desired stator voltages with a triangular carrier wave.

89. A variable speed wind turbine comprising:
a turbine rotor including at least one blade mounted to a rotatable shaft;
a multiphase induction generator having a rotor coupled to the turbine shaft for rotation therewith;
a power converter including active switches operable for controlling stator electrical quantities for each phase of the generator to establish a rotating flux field in the generator rotor;
stator current sensors operable for sensing stator currents;
torque monitor means responsive to sensed stator currents for determining a measure of generator torque;
pitch sensing means for sensing the pitch of the turbine blade;
rotor speed sensor means for sensing the speed of the generator rotor;
torque command means responsive to the generator torque, blade pitch, and rotor speed for defining a torque reference signal; and
generator controller means coupled to the active switches for controlling stator currents when the generator is operating at low rotational speeds and controlling stator voltages when the generator is operating at higher rotational speeds, wherein the generator controller means includes processor means responsive to the torque reference signal and the rotor speed for defining a flux-producing desired direct axis current in rotating field coordinates aligned with the direction of the rotor flux field and a torque-producing desired quadrature axis current in field coordinates oriented normal to the rotor flux field, the processor means including means for periodically determining an instantaneous rotor flux angle and converting the desired direct and quadrature axis currents from field coordinates into stator coordinates to define desired stator currents or voltages, and includes modulation means for controlling the active switches to produce stator currents or voltages that correspond to the desired stator currents or voltages.

90. A method for controlling torque in a wind turbine having a generator coupled to an active rectifier, wherein the generator includes a stator and a rotor, the method comprising of the steps of:
during low speed operation of the generator, controlling the orientation of a rotor flux field with respect to the rotor by switching the active rectifier to regulate currents in the stator;
determining when the generator commences operation at a higher speed above the low speed;
during the higher speed operation of the generator, controlling the orientation of the rotor flux field with respect to the rotor by switching the active rectifier to regulate voltages in the stator.

91. A method for controlling torque in a wind turbine as recited in claim 90 wherein the step of switching the active rectifier to regulate currents includes the steps of sensing the stator currents, defining desired stator currents, and minimizing a distortion index indicative of the magnitude of error between the sensed and desired stator currents.

92. A method for controlling torque in a wind turbine as recited in claim 90 wherein the step of switching the active rectifier to regulate voltages includes the steps of defining desired stator voltages and controlling the active switches by modulating the desired stator voltages with a triangular carrier wave.

93. A method for controlling torque in a wind turbine as recited in claim 90 further comprising the steps of sensing the rotational speed of the generator rotor and switching between regulating currents and regulating voltages according to the sensed rotor speed.

94. A method for controlling torque in a wind turbine having an induction generator coupled to an active rectifier, wherein the generator includes a stator and a rotor, the method comprising of the steps of:
  defining a torque reference signal indicative of a desired generator torque;
  determining a desired direct axis current representing rotor flux in a direction aligned with the rotor flux field in a rotating field coordinate system;
  converting the torque reference signal into a desired quadrature axis current representing rotor torque, wherein the quadrature axis current is normal to the rotor flux field in the field coordinate system;
  sensing the rotational speed of the generator rotor;
  defining a rotor flux angle indicative of the instantaneous position of the rotor flux field;
  during low speed operation of the generator, converting the desired quadrature and direct axis currents into desired stator currents and controlling the active rectifier to produce stator currents that correspond to the desired stator currents;
  determining when the generator commences operation at a higher speed above the low speed as a function of rotor speed; and
  during the higher speed operation of the generator, converting the desired quadrature and direct axis currents into desired stator voltages and controlling the active rectifier to produce stator voltages that correspond to the desired stator voltages.

95. A method for controlling torque in a wind turbine as recited in claim 94 wherein the step of controlling the active rectifier to regulate currents includes the steps of sensing the stator currents and minimizing a distortion index indicative of the magnitude of error between the sensed and desired stator currents.

96. A method for controlling torque in a wind turbine as recited in claim 94 wherein the step of controlling the active rectifier to regulate voltages includes the step controlling the active switches by modulating the desired stator voltages with a triangular carrier wave.

97. A method for controlling torque in a wind turbine as recited in claim 94 further comprising the step switching between regulating currents and regulating voltages according to the sensed rotor speed.

98. A method for controlling torque in a wind turbine having an induction generator coupled to an active rectifier, wherein the active rectifier establishes a rotating flux field in the generator rotor, the method comprising of the steps of:
  sensing stator currents;
  sensing the generator torque by converting the sensed stator currents into a quadrature axis current normal to the rotor flux field;
  sensing the pitch angle of the turbine blade;
  sensing the rotational speed of the generator rotor;
  defining a torque reference signal indicative of a desired generator torque in response to the sensed generator torque, pitch angle, and rotational speed;
  determining a desired direct axis current representing rotor flux in a direction aligned with the rotor flux field in a rotating field coordinate system;
  converting the torque reference signal into a desired quadrature axis current representing rotor torque, wherein the quadrature axis current is normal to the rotor flux field in the field coordinate system;
  periodically defining a rotor flux angle indicative of the instantaneous position of the rotor flux field;
  periodically converting the desired quadrature and direct axis currents into desired stator currents when the generator is operating at low rotational speeds and into desired stator voltages when the generator is operating at higher rotational speeds; and
  periodically supplying pulse width modulation signals to the active rectifier to produce stator currents that correspond to the desired stator currents at the low rotational speeds and to produce stator voltages that correspond to the desired stator voltages at the higher rotational speeds.

99. A variable speed wind turbine comprising:
  a turbine rotor including at least one blade mounted to a rotatable shaft;
  a multiphase induction generator having a stator and a rotor coupled to the turbine shaft for rotation therewith;
  a power converter including active switches operable for controlling stator currents for each phase of the generator;
  torque command means associated with turbine parameter sensors for defining a torque reference signal;
  means coupled to the power converter for sensing stator currents; and
  generator controller means coupled to the power converter for controlling the stator currents, including means for defining desired stator currents, means for periodically determining a distortion index indicative of errors between desired and actual stator currents, and means for controlling the active switches to produce stator currents that minimize the distortion index.

100. A wind turbine as recited in claim 99 wherein the generator controller means further includes means for periodically computing a distortion index for each combination of switch states and for periodically selecting a switch state that minimizes the distortion index.

101. A wind turbine as recited in claim 99 wherein the generator controller means further includes means for converting the desired stator currents into desired stator voltages, means for comparing the desired stator voltages to the voltages that would result from each combination of switch states of the active switches, and means for choosing the switch state having associated voltages that are nearest to the desired stator voltages.

102. A wind turbine as recited in claim 99 wherein the distortion index is proportional to the sum of the squares of the current errors.

103. A wind turbine as recited in claim 99 wherein the distortion index is proportional to the sum of the sum of the absolute value of the current errors.

104. A variable speed wind turbine comprising:
  a turbine rotor including at least one blade mounted to a rotatable shaft;

a multiphase induction generator having a stator and a rotor coupled to the turbine shaft for rotation therewith;

power converter means coupled to the generator for converting the power generated by the generator to DC and then to a fixed frequency AC output, wherein the power converter means includes a bridge inverter having active switches and operable for controlling output currents;

means for sensing output currents; and inverter controller means coupled to the bridge inverter for controlling the output currents, including means for defining desired output currents, means for periodically determining a distortion index indicative of errors between desired and actual output currents, and means for controlling the active switches to produce output currents that minimize the distortion index.

105. A wind turbine as recited in claim 104 wherein the inverter controller means further includes means for periodically computing a distortion index for each combination of switch states and for periodically selecting a switch state that minimizes the distortion index.

106. A wind turbine as recited in claim 104 wherein the inverter controller means further includes means for converting the desired output currents into desired output voltages, means for comparing the desired output voltages to the voltages that would result from each combination of switch states of the active switches, and means for choosing the switch state having associated voltages that are nearest to the desired output voltages.

107. A wind turbine as recited in claim 104 wherein the distortion index is proportional to the sum of the squares of the current errors.

108. A wind turbine as recited in claim 104 wherein the distortion index is proportional to the sum of the sum of the absolute value of the current errors.

109. A variable speed wind turbine comprising:

a turbine rotor including at least one blade mounted to a rotatable shaft;

a multiphase induction generator having a stator and a rotor coupled to the turbine shaft for rotation therewith;

a power converter including active switches operable for controlling stator currents for each phase of the generator and for establishing a rotating flux field in the generator rotor;

rotor speed sensor means for monitoring the speed of the generator rotor and for defining a rotor speed signal in accordance therewith;

torque command means associated with turbine parameter sensors for defining a torque reference signal;

means coupled to the power converter for sensing stator currents; and generator controller means coupled to the power converter for controlling the stator currents, including means for defining desired stator currents, means for periodically determining a distortion index indicative of errors between desired and actual stator currents, and means for controlling the active switches to produce stator currents that minimize the distortion index; and wherein the means for defining desired stator currents includes field orientation means for defining the magnitude of the rotor flux field as a function of a desired direct axis current in rotating field coordinates aligned with the direction of the rotor flux field and for converting the torque reference and rotor speed signals into a desired quadrature axis current in field coordinates oriented normal to a rotor flux vector, and including means for periodically determining an instantaneous rotor flux angle and converting the desired direct and quadrature axis currents from the field coordinates into stator coordinates to define the desired stator currents.

110. A method for controlling stator currents in a wind turbine generator rotating at variable speeds to obtain torque control of the generator, wherein the stator currents are switched by an active rectifier, the method comprising the steps of:

determining desired stator currents;

sensing the actual stator currents; and switching the active rectifier to produce stator currents that minimize a distortion index indicating the magnitude of current errors between the actual and desired stator currents.

111. A method for controlling stator currents as recited in claim 110 further comprising the step of periodically computing a distortion index for each combination of switch states and selecting a switch state that minimizes the distortion index.

112. A method for controlling stator currents as recited in claim 110 further comprising the steps of converting the desired stator currents into desired stator voltages, comparing the desired stator voltages to the voltages that would result from each combination of switch states of the active switches, and choosing the switch state having associated voltages that are nearest to the desired stator voltages.

113. A method for controlling stator currents as recited in claim 110 further comprising the step of computing a distortion index that is proportional to the sum of the squares of the current errors.

114. A method for controlling stator currents as recited in claim 110 further comprising the step of computing a distortion index that is proportional to the sum of the sum of the absolute value of the current errors.

115. A method for controlling output currents generated by a wind turbine generator rotating at variable speeds, wherein the output currents are switched by a bridge inverter coupled to a DC voltage source powered by the generator, the method comprising the steps of:

determining desired output currents;

sensing the actual output currents; and switching the bridge inverter to produce output currents that minimize a distortion index indicating the magnitude of current errors between the actual and desired output currents.

116. A method for controlling output currents as recited in claim 115 further comprising the step of periodically computing a distortion index for each combination of switch states of the bridge inverter and selecting a switch state that minimizes the distortion index.

117. A method for controlling output currents as recited in claim 115 further comprising the steps of converting the desired output currents into desired output voltages, comparing the desired output voltages to the voltages that would result from each combination of switch states of the bridge inverter, and choosing the switch state having associated voltages that are nearest to the desired output voltages.

118. A method for controlling output currents as recited in claim 115 further comprising the step of computing a distortion index that is proportional to the sum of the squares of the current errors.

119. A method for controlling output currents as recited in claim 115 further comprising the step of computing a distortion index that is proportional to the sum of the sum of the absolute value of the current errors.

120. A method for controlling stator currents in a wind turbine generator rotating at variable speeds to obtain torque control of the generator, wherein the stator currents are switched by an active rectifier that establishes a rotating flux field in the generator rotor, the method comprising the steps of:
defining a torque reference signal indicative of a desired generator torque;
determining a desired direct axis current representing rotor flux in a direction aligned with the rotor flux field in a rotating field coordinate system;
converting the torque reference signal into a desired quadrature axis current representing rotor torque, wherein the quadrature axis current is normal to the rotor flux field in the field coordinate system;
sensing the rotational speed of the generator rotor;
sensing the actual stator currents;
defining a rotor flux angle indicative of the instantaneous position of the rotor flux field;
converting the desired quadrature and direct axis currents into desired stator currents in a stationary stator coordinate system using the rotor flux angle;
determining a distortion index indicative of the magnitude of current errors between the actual and desired stator currents; and
supplying pulse width modulation signals to the switches of the active rectifier to produce stator currents that minimize the distortion index 121. A variable speed wind turbine comprising:
a turbine rotor including at least one blade mounted to a rotatable shaft;
a multiphase induction generator having a rotor coupled to the turbine shaft for rotation therewith;
a power converter for converting variable frequency electricity generated by the generator into fixed frequency electricity, the power converter including an inverter for supplying output electricity, wherein the inverter has active switches; and
inverter controller means coupled to the inverter and responsive to a power factor control signal for controlling the active switches to supply electricity at a desired angle between voltage and current.

122. A wind turbine as recited in claim 121 wherein the power factor control signal specifies a desired level of reactive power, and wherein the inverter controller further includes means for controlling the transfer of real power so that the output currents provide the desired level of reactive power.

123. A wind turbine as recited in claim 121 wherein the power factor control signal specifies a desired angular relationship between voltage and current of the output electricity.

124. A wind turbine as recited in claim 121 further comprising output current sensors operable for sensing output currents, wherein the inverter controller means further includes means responsive to the power factor control signal for supplying desired output currents.

125. A wind turbine as recited in claim 124 wherein the inverter controller means further includes means for minimizing a distortion index indicating the magnitude of current errors between the sensed and desired output currents.

126. A wind turbine as recited in claim 125 wherein the means for supplying desired output currents includes means for creating a sinusoidal reference waveform synchronized with the output electricity, means responsive to the power factor control signal for defining a template waveform that is offset from the reference waveform by a desired phase angle, and means for converting the template waveform into the desired output currents.

127. A wind turbine as recited in claim 126 wherein the means for creating the sinusoidal reference waveform includes means for sensing the voltages of the output electricity and for defining the reference waveform from the output voltages.

128. A wind turbine as recited in claim 126 wherein the means for defining a template waveform includes processor means for periodically calculating the template waveform by shifting the reference waveform by an angle specified by the power factor control signal.

129. A wind turbine as recited in claim 126 further comprising means for regulating the voltage at the input of the inverters by multiplying the template waveform before conversion into the desired output currents by a control variable indicative of the inverter input voltage.

130. A variable speed wind turbine comprising:
a turbine rotor including at least one blade mounted to a rotatable shaft;
a multiphase induction generator having a rotor coupled to the turbine shaft for rotation therewith;
a power converter for converting variable frequency electricity generated by the generator into fixed frequency electricity, the power converter including a rectifier, inverter, and DC voltage link coupled between the rectifier and inverter, wherein the rectifier includes a pair of active switches for each phase of the generator coupled between the DC voltage link and a stator power tap and operable for switching stator current therebetween, and wherein the inverter includes a pair of active switches for each phase of output power coupled between the DC voltage link and an output tap and operable for switching inverter current therebetween;
output current sensors operable for sensing output currents; and
an inverter controller coupled to the inverter and responsive to a power factor control signal for controlling the inverter switches to supply output electricity at a desired angle between voltage and current, wherein the inverter controller includes means for creating a sinusoidal reference waveform synchronized with the output electricity, means responsive to the power factor control signal for defining a template waveform that is offset from the reference waveform by a desired phase angle, means responsive to the voltage of the DC voltage link for multiplying the template waveform by a control variable indicative of the inverter input voltage, means for converting the multiplied template waveform into the desired output currents, and means for controlling the active switches of the inverter to produce output currents that correspond to the desired output currents.

131. A method for converting electricity generated by a variable speed wind turbine into fixed frequency output electricity, wherein the wind turbine includes a generator and means for supplying generated electricity to power converter that includes a switched inverter supplying the output electricity, the method comprising the steps of:
- forming a reference waveform;
- rotating the reference waveform by a selected power factor angle to yield a template waveform;
- using the template waveform to define desired output currents; and
- controlling the switched inverter to produce output currents corresponding to the desired output currents.

132. A method for converting electricity as recited in claim 131 further comprising the steps of sensing the level of reactive power in the output electricity, and selecting the power factor angle according to a desired level of reactive power.

133. A method for converting electricity as recited in claim 131 further comprising the steps of sensing output currents and minimizing a distortion index indicative of the magnitude of current errors between the sensed and desired output currents.

134. A method for converting electricity as recited in claim 131 further comprising the steps of creating a sinusoidal reference waveform synchronized with the output electricity, defining a template waveform that is offset from the reference waveform by the power factor angle, and converting the template waveform into the desired output currents.

135. A method for converting electricity as recited in claim 134 wherein the step of creating a reference waveform includes the steps of sensing the voltages of the output electricity and defining the reference waveform from the sensed output voltages.

136. A method for converting electricity as recited in claim 134 wherein the step of defining a template waveform includes the step of periodically calculating the template waveform by shifting the reference waveform by the power factor angle.

137. A method for converting electricity as recited in claim 134 further comprising the step of regulating the voltage at the input of the inverters by multiplying the template waveform before conversion into the desired output currents by a control variable indicative of the inverter input voltage.

138. A method for converting electricity generated by a variable speed wind turbine into fixed frequency output electricity, wherein the wind turbine includes a generator and means for supplying generated electricity to power converter that includes a switched inverter supplying the output electricity, the method comprising the steps of:
- forming a sinusoidal reference waveform synchronized with the output electricity;
- rotating the reference waveform by a selected power factor angle to yield a template waveform;
- sensing the input voltage to the inverter and defining a current control signal in response thereto;
- multiplying the template waveform by the current control signal to define desired output currents;
- sensing the output currents; and
- controlling the switched inverter to produce output currents corresponding to the desired output currents by minimizing a distortion index indicative of the magnitude of current errors between the sensed and desired output currents.

* * * * *

US005083039B1

REEXAMINATION CERTIFICATE (3934th)

United States Patent [19]
Richardson et al.

[11] B1 5,083,039
[45] Certificate Issued Nov. 16, 1999

[54] VARIABLE SPEED WIND TURBINE

[75] Inventors: Robert D. Richardson, San Ramon; William L. Erdman, Livermore, both of Calif.

[73] Assignee: Zond Energy Systems, Inc., Tehachapi, Calif.

Reexamination Request:
No. 90/005,079, Aug. 21, 1998

Reexamination Certificate for:
Patent No.: 5,083,039
Issued: Jan. 21, 1992
Appl. No.: 08/649,567
Filed: Feb. 1, 1991

[51] Int. Cl.[6] ........................................................ H02P 9/00
[52] U.S. Cl. ............................................. 290/44; 290/55
[58] Field of Search ........................... 290/44, 55; 322/29

[56] References Cited

U.S. PATENT DOCUMENTS

| | | | |
|---|---|---|---|
| 2,152,576 | 3/1939 | Weeks | 290/44 |
| 2,179,885 | 11/1939 | Fumagalli | 290/55 |
| 3,829,759 | 8/1974 | Thorborg | 323/119 |
| 3,959,719 | 5/1976 | Espelage | 323/102 |
| 3,999,117 | 12/1976 | Gyugyi et al. | 323/119 |
| 4,146,264 | 3/1979 | Korzeniewski | 290/44 |
| 4,174,497 | 11/1979 | Depenbrock | 323/119 |

(List continued on next page.)

FOREIGN PATENT DOCUMENTS

| | | |
|---|---|---|
| 0072598 | 2/1988 | European Pat. Off. . |
| 691878 | 3/1930 | France . |
| 1177031 | 4/1959 | France . |
| 2292879 | 6/1976 | France . |
| 3529404 | 2/1987 | Germany . |
| 3628137 | 2/1988 | Germany . |
| 3844505 | 7/1990 | Germany . |
| 52-48748 | 4/1977 | Japan . |
| 58-152902 | 9/1983 | Japan . |
| 61-73599 | 4/1986 | Japan . |
| 61-240900 | 10/1986 | Japan . |
| 62-123883 | 6/1987 | Japan . |
| 62-123992 | 6/1987 | Japan . |
| 62-123995 | 6/1987 | Japan . |
| 62-123998 | 6/1987 | Japan . |
| 0029064 | 2/1988 | Japan . |
| 63-39500 | 2/1988 | Japan . |
| 62-123997 | 5/1989 | Japan . |
| 1237360 | 9/1989 | Japan . |
| 107979 | 10/1942 | Netherlands . |
| 969954 | 10/1982 | U.S.S.R. . |
| 985405 | 12/1982 | U.S.S.R. . |
| 1366688 | 1/1988 | U.S.S.R. . |
| 1443119A | 7/1988 | U.S.S.R. . |
| 1455039 | 1/1989 | U.S.S.R. . |
| 1574899 | 6/1990 | U.S.S.R. . |
| 225815 | 2/1925 | United Kingdom . |
| 1478743 | 7/1977 | United Kingdom . |
| 2036881 | 7/1980 | United Kingdom . |

OTHER PUBLICATIONS

Mohan et al., *Power Electronics: Converters, Applications and Design,* John Wiley & Sons, Inc., 1989, pp. vii–ix, 102–113, 129–152, and 402–427.

Ooi et al., Proceedings of the IEEE "A Three Phase Controlled–Current PWM Converter with Leading Power Factor" vol. 1A–23, No. 1 (1987) pp. 78–84.

Thorborg, *Power Electronics,* Prentice Hall International (UK) Ltd., 1988, pp. 85–86 and 209–211.

Brogan W.L., "Modern Control Theory", Prentice Hall, New Jersey, 1986, Chapter 17.

(List continued on next page.)

*Primary Examiner*—Nicholas Ponomarenko

[57] ABSTRACT

A variable speed wind turbine is disclosed comprising a turbine rotor that drives an AC induction generator, a power converter that converts the generator output to fixed-frequency AC power, a generator controller, and an inverter controller. The generator controller uses field orientation to regulate either stator currents or voltages to control the torque reacted by the generator. The inverter controller regulates the output currents to supply multi-phase AC power having leading or lagging currents at an angle specified by a power factor control signal.

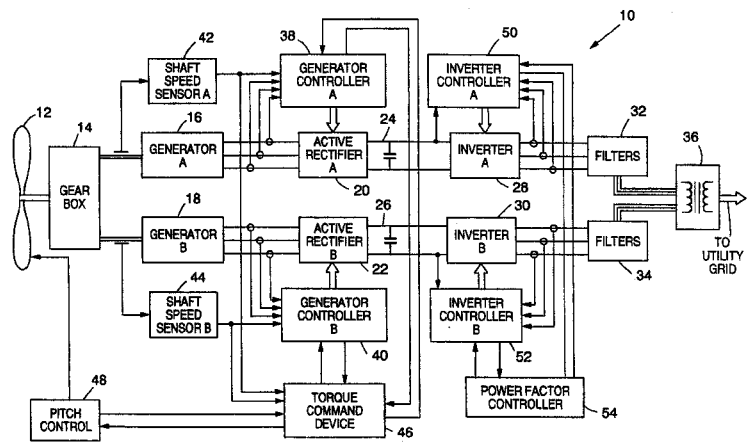

U.S. PATENT DOCUMENTS

| | | | |
|---|---|---|---|
| 4,205,235 | 5/1980 | Pal et al. ................................. | 290/44 |
| 4,348,631 | 9/1982 | Gyugyi et al. .......................... | 323/211 |
| 4,410,807 | 10/1983 | Buffington .............................. | 307/68 |
| 4,418,287 | 11/1983 | Syverson ................................. | 290/44 |
| 4,420,692 | 12/1983 | Kos et al. ................................ | 290/44 |
| 4,426,192 | 1/1984 | Chertok et al. ......................... | 416/1 |
| 4,427,897 | 1/1984 | Migliori .................................. | 290/44 |
| 4,438,341 | 3/1984 | Winterbotham ......................... | 290/44 |
| 4,461,957 | 7/1984 | Jallen ...................................... | 290/44 |
| 4,490,093 | 12/1984 | Chertok et al. ......................... | 416/26 |
| 4,511,807 | 4/1985 | Somerville .............................. | 290/44 |
| 4,525,633 | 6/1985 | Wertheim et al. ...................... | 290/44 |
| 4,565,929 | 1/1986 | Baskin et al. ........................... | 290/44 |
| 4,585,950 | 4/1986 | Lund ....................................... | 290/44 |
| 4,636,707 | 1/1987 | Law ........................................ | 322/35 |
| 4,695,736 | 9/1987 | Doman et al. ........................... | 290/44 |
| 4,700,081 | 10/1987 | Kos et al. ................................ | 290/44 |
| 4,703,189 | 10/1987 | DiValentin et al. ..................... | 290/44 |
| 4,816,696 | 3/1989 | Sakayori et al. ........................ | 290/52 |
| 4,891,744 | 1/1990 | Yamamoto et al. ..................... | 363/89 |
| 4,906,060 | 3/1990 | Claude .................................... | 322/29 |
| 4,954,726 | 9/1990 | Lipman et al. .......................... | 307/46 |
| 4,994,684 | 2/1991 | Lauw et al. ............................. | 290/52 |
| 4,994,981 | 2/1991 | Walker et al. ........................... | 364/492 |

OTHER PUBLICATIONS

Erdman, W.L., "A Trajectory Sensitivity Approach to Parameter Disturbance Problems in Indirect Field Oriented Drives", Ph.D. Dissertation, University of Missouri Columbia, Dec., 1989.

Ertl, H. et al., "Analysis of Different Current Control Concepts for Forced Commutated Rectifier", Power Conversion International Conference, Jun. 17–19, 1986.

Hinrichsen, E.N., "Variable Rotor Speed for Wind Turbines: Objectives and Issues" AP–4261, Research Project 1996–1999, Final Report, Sep. 1985, Research Reports Center, Palo Alto, California.

Holley et al., "Optimal Quasistatic Control of Variable Speed Wind Turbines", European Wind Energy Conference and Exhibition, Jul. 10–13, 1989 (EWEC '89) pp. 341–344.

Leonard, W., "Control of Electrical Drives", Springer–Verlag, Heidelberg, 1985, Chap. 9–12.

McNerney et al., The Effect of a Power Electronic Converter on Power Fluctuation and Harmonic Distortion in a WECS, ASME Wind Energy Symposium, New Orleans, Jan. 1990.

Marechal et al., "Variable Speed Optimal Control of a Windgenerator", European Wind Energy Association Conference and Exhibition, 7–9 Oct., 1986, Rome, Italy.

Matsuzaka et al., "A Variable Speed Wind Generating System and its Test Results", Hachinohe Institute of Technology, Tohoku Electric Power Company, Japan.

Nishimoto, M. et al., "An Integrated Controlled–Current PWM Rectifier Chopper Link for Sliding Mode Position Control", Presented a the IEEE Industry Application Society Annual Meeting, 1986.

Smith et al., "A Variable–Speed Constant–Frequency Induction Generator for Sub and Supersynchoronous Operation", European Wind Energy Association Conference and Exhibition, 7–9 Oct., 1986, Rome, Italy.

Ziogas, P.D. et al., "Optimum System Design of the Three–Phase PWM Rectifier–Inverter Type Frequency Charger", Presented at the IEEE Industry Application Society Annual Meeting, 1985.

Matsuzaka, T. et al., *A Variable Speed Wind Generating System And It's Test Results,* Machine Institute of Technology, 5 pages.

Mohan, N. et al., *Power Electronics Converters, Applications, And Design,* John Wiley & Sons (1989) pp. vii–426.

Yoshihiko, S. New Static Var Control Using Force–Communicated Inverters, IEEE Transactions (Sep. 9, 1981) pp. 4216–4224.

Ooi, A Three–Phase Controlled–Current PWM Converter With Leading Power Factor., IEEE Transactions dated (Jan./Feb. 1987) pp. 78–84.

Ooi, *Paper On HVDC Interface Systems (Title–Unknown),* (Jan. 3, 1991) pp. 78–84.

Phillips, G.A. et al. Progress In Self–Commutated Inverters For Fuel Cells And Batteries, IEEE Transactions Jul./Aug. 1979 pp. 1466–1475.

Fletcher R.G. et al. Use Of Active Rectifiers With Induction Motor Drives, Motors Digest 1989/60 p. 3.

Prof. Kant M. et al., Wind Energy Conversion System With Electromagnetic Stabiliser, IEE Proceedings, (1979).

Johnson, R. Swedish Wind–Power—Squally Winds Are A problem In Electrical–Power Generation, Eltek. Aktuell Eledtron A (Sweden), vol. 20, No. 15 (Oct. 1977).

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-138 is confirmed.

* * * * *